(12) United States Patent
Mizushima et al.

(10) Patent No.: US 7,938,541 B2
(45) Date of Patent: May 10, 2011

(54) LASER PICTURE FORMATION DEVICE AND COLOR PICTURE FORMATION METHOD

(75) Inventors: Tetsuro Mizushima, Osaka (JP); Ken'ichi Kasazumi, Osaka (JP); Akihiro Morikawa, Osaka (JP); Hiroyuki Furuya, Nara (JP); Kazuhisa Yamamoto, Osaka (JP); Yoshimasa Fushimi, Osaka (JP)

(73) Assignee: Panasonic Corporation, Osaka (JP)

( * ) Notice: Subject to any disclaimer, the term of this patent is extended or adjusted under 35 U.S.C. 154(b) by 497 days.

(21) Appl. No.: 12/065,585

(22) PCT Filed: Sep. 1, 2006

(86) PCT No.: PCT/JP2006/317361
§ 371 (c)(1),
(2), (4) Date: Mar. 3, 2008

(87) PCT Pub. No.: WO2007/026885
PCT Pub. Date: Mar. 8, 2007

(65) Prior Publication Data
US 2009/0195707 A1    Aug. 6, 2009

(30) Foreign Application Priority Data

Sep. 1, 2005 (JP) ................................. 2005-253169
Sep. 1, 2005 (JP) ................................. 2005-253170

(51) Int. Cl.
*G03B 21/14* (2006.01)
(52) U.S. Cl. .......................................... 353/31; 353/94
(58) Field of Classification Search .................... 353/31, 353/94, 33, 37; 349/8; 348/742–757
See application file for complete search history.

(56) References Cited

U.S. PATENT DOCUMENTS

| 5,515,136 A * | 5/1996 | Nishio et al. ..................... 355/37 |
| 6,547,400 B1 | 4/2003 | Yokoyama ........................ 353/98 |
| 6,648,475 B1 * | 11/2003 | Roddy et al. ..................... 353/31 |
| 6,736,514 B2 | 5/2004 | Horvath et al. .................. 353/31 |
| 2003/0160859 A1 | 8/2003 | Roddy et al. ..................... 347/239 |
| 2003/0214633 A1 | 11/2003 | Roddy et al. ..................... 353/31 |
| 2003/0234911 A1 | 12/2003 | Horvath et al. .................. 353/31 |
| 2004/0001185 A1 | 1/2004 | Wada ............................... 353/31 |
| 2004/0017549 A1 | 1/2004 | Goto et al. ....................... 353/31 |
| 2005/0243048 A1 * | 11/2005 | Moriya et al. ................... 345/88 |

FOREIGN PATENT DOCUMENTS

| JP | 5-66501 | 3/1993 |
| JP | 10-293268 | 11/1998 |
| JP | 11-97779 | 4/1999 |
| JP | 2000-194066 | 7/2000 |
| JP | 2001-174919 | 6/2001 |
| JP | 2001-249400 | 9/2001 |
| JP | 2002-72360 | 3/2002 |

(Continued)

*Primary Examiner* — Seung C Sohn
(74) *Attorney, Agent, or Firm* — Steptoe & Johnson, LLP

(57) ABSTRACT

The laser picture formation device includes a two-dimensional modulation element performing video image modulation as well as four or more laser light sources having different center wavelengths. The video images which have no speckle noises at the wavelength region that has high visibility, which are realized by simultaneously emitting the laser lights of green (G) and yellowish green (Y) which have particularly high visibility, and video images which are vivid as cannot be represented by the conventional display, and which can be realized by controlling the laser lights of respective colors independently, can be displayed. Particularly, by modulating the two-dimensional modulation element and the laser light output with synchronized with each other, various video displays are enabled.

23 Claims, 11 Drawing Sheets

FOREIGN PATENT DOCUMENTS

| | | |
|---|---|---|
| JP | 2004-334083 | 11/2004 |
| JP | 2005-99160 | 4/2005 |
| JP | 2005-128563 | 5/2005 |
| JP | 2005-159075 | 6/2005 |
| JP | 2005-189277 | 7/2005 |
| WO | WO95/20811 | 8/1995 |

* cited by examiner

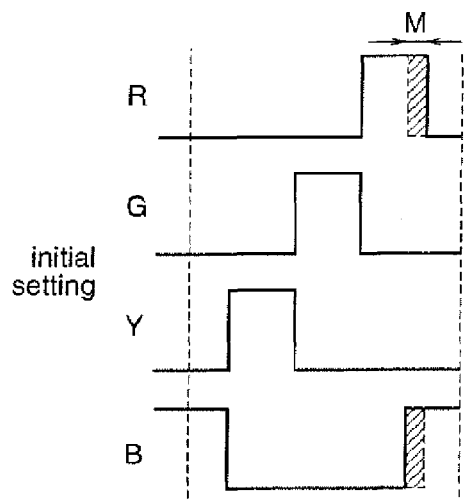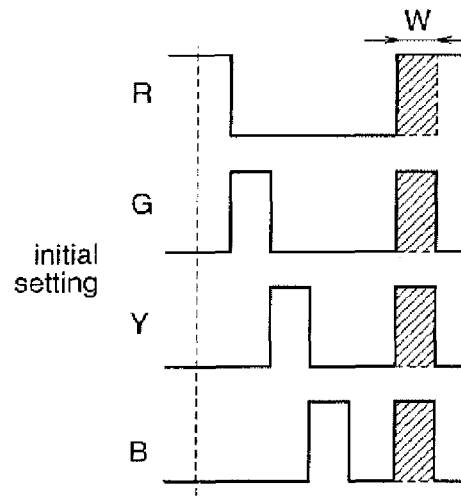
Fig.10(a)  Fig.10(b)
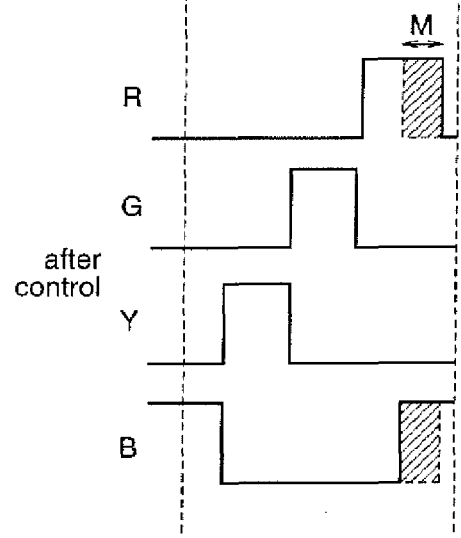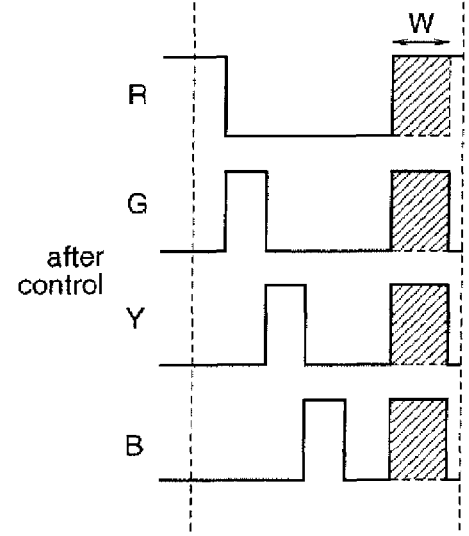

LASER PICTURE FORMATION DEVICE AND COLOR PICTURE FORMATION METHOD

The present application is based on International Application PCT/JP2006/317361, filed Sep. 1, 2006, which claims priority of Japanese Patent Application No. 2005-253169, filed Sep. 1, 2005, and Japanese Patent Application No. 2005-253170, filed Sep. 1, 2005.

TECHNICAL FIELD

The present invention relates to a laser picture formation device for displaying video images with modulating lights from laser light sources and a color picture formation method.

BACKGROUND ART

As a video image formation device, a projection display displaying video images on a screen has been widely spread. For a projection display, a lamp light source is generally employed. However, a lamp light source has drawbacks in that the lifetime is short, the light utilization efficiency is low, and the color reproduction range is limited.

In order to solve these problems, it is attempted to employ a laser light source as a light source for a picture formation device. The laser light source is lengthy in its lifetime with relative to a lamp, and further, since it has strong directionality, it is likely to enhance the utilization efficiency. Further, since the laser light source shows the monochromaticity, the color display range is large and the display of vivid image is possible.

A schematic view of a laser picture formation device is shown in FIG. 12. The lights emitted from the laser light sources 1R, 1G, and 1B of RGB three colors are introduced to the illumination optical system 2 which irradiates the modulation element 71. The illumination optical system 2, which includes speckle noise removal means 3, optical integrator 4, and projection optical system 6, shapes the light beam from the laser light source into the same configuration as the effective plane of the modulation element 71 as well as makes its light intensity distribution uniform, thereby irradiating the modulation element 71. After video images are modulated by the modulation elements of respective colors, the lights are synthesized by the dichroic prism 9, and the resulted color image is broadened and projected onto the screen 10 by the projection optical system 8. The speckle removal means 3, which comprises such as a rotating renticular lens, varies such as an angle of the laser light in view of time, thereby removing speckle noises which occur due to the interferences of laser lights.

As described above, in a display employing a laser light source (hereinafter, referred to as a laser display), there is a problem that speckle noises may occur due to that the laser lights have high coherency. The speckle noises are noises in minute particle like shapes which can be captured by viewer's eyes due to that the scattered lights interfere with each other when the laser lights are scattered by the screen. The speckle noises are noises which are produced by particles having sizes which are determined by the F (F number) of the viewer's eyes and the wavelength of the laser light source are arranged at random, and these obstruct the observer from capturing the video images on the screen, thereby leading to a serious deterioration in video images. Particularly, the speckle noises due to the lasers of the wavelengths of green and yellowish green which have high visibility to human beings cause large influences in the video image deterioration.

Up until now, as a method for reducing the speckle noises, there was such as a proposal of deflecting the light with a frequency that is higher than the frame frequency in a spatial modulator and irradiating the resulted light to the spatial modulator, thereby to reduce speckle noises (for example, Patent Document 1).

In addition, in a laser picture formation device employing RGB light emission elements, there was a proposal of employing an array of RGB light emission elements and employing a single modulation element in a time divisional manner (for example, Patent Document 2).

Patent Document 1: Japanese Published Patent Application No. 10-293268

Patent document 2: Japanese Published Patent Application No. 2001-249400

DISCLOSURE OF THE INVENTION

Problems to be Solved by the Invention

Though there were proposals as measures for reducing speckle noises in a laser display until now, there was no proposal for the reduction of speckle noises in the wavelength range having a high visibility, which wavelength range particularly gives serious influences to the viewer.

The present invention is directed to providing a laser picture formation device employing laser light sources which can reduce the speckle noises in the wavelength range having a high visibility as well as can provide vivid video images which cannot be presented by the conventional display.

Measures to Solve the Problems

In order to solve the above-described problems, a laser picture formation device according to claim 1 of the present invention is a laser picture formation device comprising laser light sources and a two-dimensional modulation element which carries out modulation of video images, wherein there are provided BGYR four color laser light sources where the center wavelength of B is 430 to 475 nm, the center wavelengths of G and Y are 480 to 560 nm, and the center wavelength of R is 610 to 680 nm, at least one of the G and Y laser light sources is a wavelength conversion laser, and the difference between the center wavelengths of the G and Y laser light sources is larger than 2 nm and smaller than 60 nm.

According to claim 5 of the present invention, there is provided a laser picture formation device as defined in claim 1, wherein the center wavelengths of G and Y among the BGYR four color laser light sources are G:480 to 520 nm and Y:520 to 560 nm, respectively.

According to claim 6 of the present invention, there is provided a laser picture formation device comprising laser light sources and a two-dimensional modulation element which carries out modulation of video images, said device including BGYR four color laser light sources where the center wavelength of B is 430 to 475 nm, the center wavelengths of G and Y are 480 to 560 nm, and the center wavelength of R is 610 to 680 nm, wherein, when the pixels in the color reproducible range that can be displayed by using both of the G and Y colors are displayed, the laser light outputs from both the G and Y laser light sources are displayed.

Further, according to claim 22 of the present invention, there is provided a laser picture formation device as defined in claim 6, wherein when the pixel within the color reproducible range that can be displayed by using both of G and Y colors are displayed, the luminances of G and Y colors displayed in the pixel comprise one being ⅔ to ½ of the other.

According to claim 7 of the present invention, there is provided a laser picture formation device as defined in claim 1, wherein the input video signal which is inputted to the laser picture formation device is/are converted into an output video control signal for controlling the outputs of the four or more respective color signals.

According to claim 8 of the present invention, there is provided a laser picture formation device as defined in claim 1, wherein the modulation of the laser lights which are outputted from the four or more laser light sources are controlled independently for respective colors.

According to claim 9 of the present invention, there is provided a laser picture formation device as defined in claim 8, wherein the modulation of the emitted powers from the respective color laser light sources are controlled independently for respective colors dependent on the input video signal and/or the auditory environments.

According to claim 10 of the present invention, there is provided a laser picture formation device as defined in claim 1 or 8, wherein said laser picture formation device has one two-dimensional modulation element, and employs said one two-dimensional modulation element for the laser lights from the four or more respective laser light sources with carrying out time division of the video image modulation by the two-dimensional modulation element.

According to claim 11 of the present invention, there is provided a laser picture formation device as defined in claim 10, wherein the respective division times for the video image modulation by the two-dimensional modulation element are modulated according to the input video signal.

According to claim 12 of the present invention, there is provided a laser picture formation device as defined in claim 11, wherein the respective division times are for the video image modulation by the two-dimensional modulation element are modulated according to the output of the laser light source monitor which monitors the laser light emitted from the laser light source and/or the display mode that is set.

According to claim 13 of the present invention, there is provided a laser picture formation device as defined in claim 8 or 10 wherein, the output video image control signal for controlling the outputs of the four or more respective color signals which are converted from the input video signal includes at least the modulation signal for the two-dimensional modulation element and the modulation signal for modulating the laser light intensity.

According to claim 14 of the present invention, there is provided a laser picture formation device as defined in claim 8 or 10 wherein, the output video image control signal for controlling the outputs of the four or more respective color signals which are converted from the input video signal includes at least the modulation signal for the two-dimensional modulation element and the modulation signal for modulating the laser light emission time.

According to claim 15 of the present invention, there is provided a laser picture formation device as defined in claim 14 wherein, the laser light emission time is synchronously modulated with the video image modulation in the respective division times by the two-dimensional modulation element according to the input video signal.

According to claim 16 of the present invention, there is provided a laser picture formation device comprising laser light sources and a two-dimensional modulation element which carries out modulation of video images, wherein there are provided four or more laser light sources having different center wavelengths, the four or more laser light sources have times in which the plural color laser light sources emit laser lights simultaneously to the two-dimensional modulation element.

According to claim 17 of the present invention, there is provided a laser picture formation device as defined in claim in claim 16, wherein the respective plural color laser light sources control the output power modulation in the time during when the self laser light source and the other laser light source emit simultaneously the laser outputs to the two-dimensional modulation element and the emission power modulation in the time during when the self laser light source emits only one color to the two-dimensional modulation element independently from each other.

According to claim 18 of the present invention, there is provided a laser picture formation device as defined in claim 1, wherein the color display range in the chromaticity coordinate is controlled according to the environment.

According to claim 19 of the present invention, there is provided a laser picture formation device as defined in claim 18, wherein the color display range is broader than the input image signal reference chromaticity range and a range which is pursuant to the input video signal reference chromaticity or a range which is pursuant to the color reproducible range.

According to claim 20 of the present invention, there is provided a laser picture formation device as defined in claim 9 or 17, wherein the laser cooling temperature is controlled accompanying with the emission power modulation of the laser light source.

According to claim 21 of the present invention, there is provided a laser picture formation method which employs four or more laser light sources and one or more two-dimensional modulation elements carrying out modulation of video images to produce video images, which comprises: carrying out video image formation with performing modulations of video images using one or plural two-dimensional video image modulation elements and modulations of laser light outputs from the four or more laser light sources with synchronizing those with each other.

EFFECTS OF THE INVENTION

According to the laser picture formation device and the color picture formation method of the present invention, it is possible to display video images having no noises and having a large contrast.

That is, according to the present invention, since the four color laser light sources having different center wavelengths are employed, it is possible to display video images which has no speckle noises and which are vivid as cannot be displayed in the conventional device.

Further, according to the laser picture formation device of the present invention, since the four color laser light sources are made those of BGYR, and the difference between the center wavelengths of the G and Y laser light sources is made larger than 2 nm and smaller than 60 nm, it is possible to display video images that have reduced speckle noises in the wavelength region of a higher visibility and has less color heterogeneity.

Further, according to the laser picture formation device of the present invention, since in the color reproducible range that can be displayed by using both of the G and Y colors, the laser lights are emitted from both the G and Y light sources, it is possible to carry out display with mixing the colors of the laser light sources having high visibility, thereby reducing the speckle noises.

Further, according to the laser picture formation device, since the modulation of the laser lights which are outputted from the four or more laser light sources are controlled independently for respective colors, it is possible to display video images having a high contrast.

Further, according to the laser picture formation device of the present invention, since the respective division times for the video image modulation by the two-dimensional modulation element are modulated according to the output of the laser monitor and/or the display mode that is set, it is possible to carry out compensation in a case where the brightness or colors of the video images are changed.

Further, according to the laser picture formation device of the present invention, since the laser light emission time is synchronously modulated with the modulation of the respective division times of the video image modulation of the two-dimensional modulation element according to the input video signal, it is possible to increase the gradation number and the contrast of the video images, and thereby various video image representation is enabled.

Further, according to the laser picture formation device of the present invention, since the respective plural color laser light sources control the output power modulation in the time during when the self laser light source and the other laser light source emit simultaneously the laser outputs to the two-dimensional modulation element and the output power modulation in the time during when the self laser light source emits only one color to the two-dimensional modulation element independently from each other, it is possible to carry out adjustment of the color temperature with maintaining the power when the emission is carried out with a single color.

Further, according to the laser picture formation device of the present invention, since the color display range in the chromaticity coordinate is controlled according to the auditory environment, it is possible to suppress the reduction in the contrast due to changes in the auditory environment.

BRIEF DESCRIPTION OF THE DRAWINGS

FIG. 10 is a diagram illustrating the control of the laser light emission time in the laser picture formation device according to the present invention.

Figure 1:
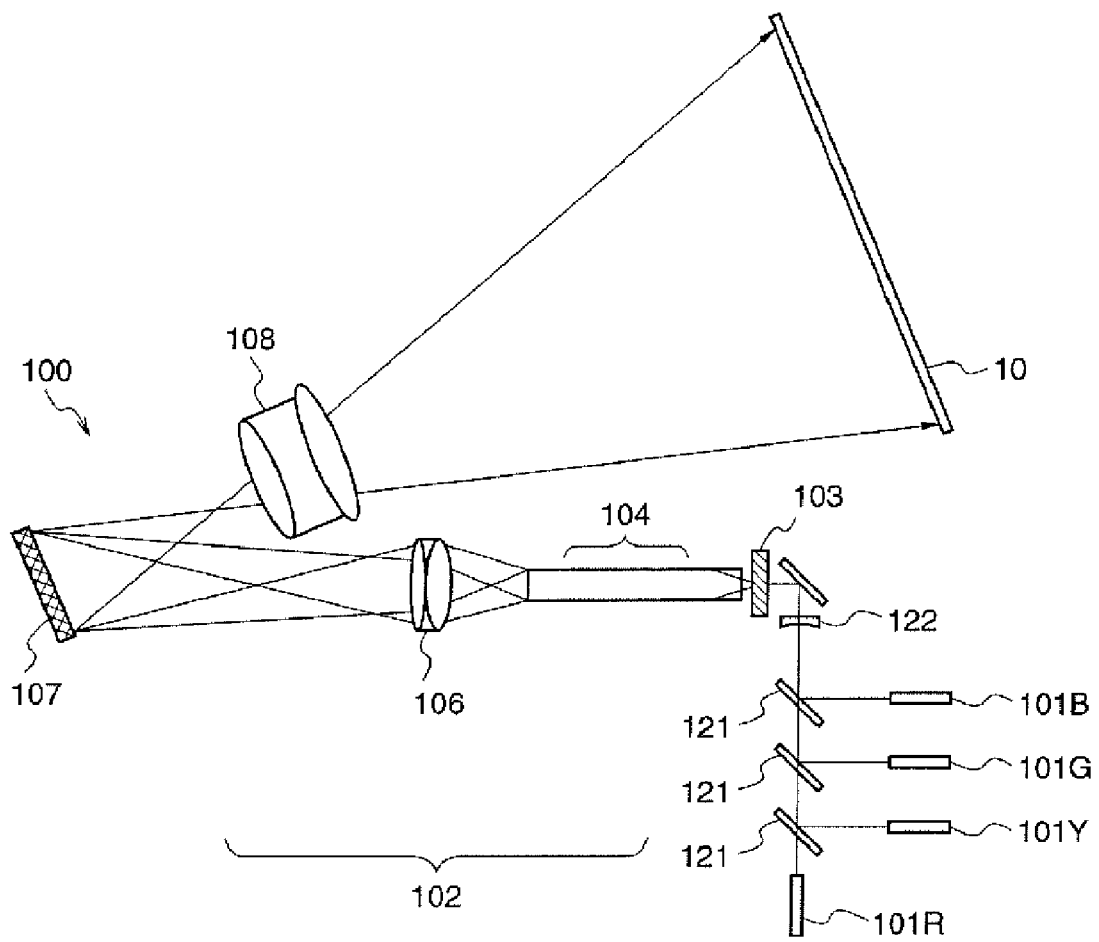
FIG. 1 is a schematic view illustrating a laser picture formation device according to a first embodiment of the present invention.

DESCRIPTION OF REFERENCE NUMERALS 100, 200 . . . laser picture formation device
101B . . . blue laser light source
101G . . . green laser light source
101Y . . . yellowish green laser light source
101R . . . red laser light source
102 . . . irradiation optical system
103, 1031-1033 . . . speckle noise removal means
104, 1041-1043 . . . optical integrator
106, 1061-1063 . . . projection optical system
107, 1071-1073 . . . two-dimensional modulation element
108 . . . projection optical system
109 . . . dichroic prism
10 . . . screen
121 . . . dichroic mirror
122 . . . lens
1061a, 1063a . . . mirror
1061b, 1062, 1063b . . . field lens
300 . . . laser picture formation device
1R . . . red laser light source
1G . . . green laser light source
1B . . . blue laser light source
2 . . . irradiation optical system
3 . . . speckle removal means
4 . . . optical integrator
6 . . . projection optical system
61 . . . mirror
62 . . . field lens
71 . . . two-dimensional modulation element
8 . . . projection optical system
9 . . . dichroic prism
10 . . . screen

BEST MODE TO EXECUTE THE INVENTION

Embodiments of the present invention will be described with reference to the drawings.

First Embodiment

FIG. 1 is a schematic diagram illustrating a laser picture formation device 100 according to a first embodiment of the present invention. FIG. 1 shows a projection display (laser display) using plural laser light sources and a single modulation elements.

In FIG. 1, the laser picture formation device 100 of the first embodiment includes four color laser light sources (101B, 101G, 101Y, 101R) of blue (B), green (G), yellowish green (Y), and red (R), a modulation element 107 carrying out the modulation of the video images, an irradiation optical system 102 irradiating the modulation element 107, and a projection optical system 108 projecting two-dimensional video images on the screen 10. The laser lights emitted from the respective laser light sources (101B, 101G, 101Y, 101R) of blue (B), green (G), yellowish green (Y), and red (R) colors are introduced to the irradiation optical system 102 irradiating the modulation element 107. The irradiation optical system 102, which includes the speckle noise removal means 103, the optical integrator 104, and the projection optical system 106, beam shapes the light of the laser light source into the same configuration as the effective surface of the modulation element 107 with approximately homogenizing the light intensity distribution thereof, the resulted beam irradiating the modulation element 107. In the first embodiment, one modulation element 107 and one optical integrator 104 are employed for the four colors, the four colors are synthesized by the dichroic mirrors 121, and then the synthesized light is introduced to the optical integrator 104 and the modulation element 107. Herein, in order to synthesize the four colors, it is also possible to carry out synthesis by employing such as deflection prisms with differentiating the deflection directions of the laser lights. It is not necessarily required to carry out synthesis, but a design of an optical path may be preferably performed such that laser lights of respective colors are incident to the optical integrator 104.

The four color laser lights are successively emitted to be subjected to a time averaging addition color mixing that is carried out on the screen with employing one modulation element 107 in a time divisional manner, thereby to display color video images. Herein, the successive emission of the laser lights may be carried out by the light emission which is always performed one by one color, or may be performed by combining the times during when the laser lights are emitted from the plural color laser light sources simultaneously.

The modulation element 107 of the first embodiment is a two-dimensional modulation element, and an element having a switching frequency of above several hundreds Hz is employed. More concretely, a reflection type two-dimensional modulation element comprising a digital micro mirror device (DMD) is employed, and two-dimensional video images produced are enlarged and projected onto the screen 10 by the projection optical system 108, and thereby vivid images on the screen 10 are provided to the viewer.

In the laser picture formation device of the first embodiment, a modulation element 107 is employed in a time divisional manner as described above. With relative to a laser picture formation device that employs plural modulation elements for respective colors correspondingly, when one modulation element is employed in a time divisional manner for the laser light sources of four colors R, G, Y, and B, since the light emission time for each laser light source is short, in order to obtain the same white color luminance, a laser power of four times of the emission peak power of one laser power source is required. In order to obtain a high emission peak power of a laser light source, increases in the number of the laser light sources in respective colors and in the light emission peak power per a laser light source are required, thereby occurring issues in cost and reliability. In the present invention, there are provided times during when laser lights are emitted from plural color laser light sources simultaneously, the light emission peak power can be suppressed. For example, with relative to a case where the white color luminance is obtained with carrying out the light emission of RGYB singly, the peak power for obtaining the same white color luminance can be suppressed to 75%, thereby resulting in a reduced cost for light sources and an increased reliability.

When employing light sources such as a lamp and an LED, if plural colors are simultaneously utilized, there may occur issues that the addition color mixing lowers the color contrast, thereby resulting in insufficient color reproduction, while the brightness can be secured. Particularly, the colors of higher brightness in the vicinity of the apexes of the RGB triangle of the color reproduction range represented in the chromaticity coordinates would not be able to be reproduced. In the present invention, however, by employing laser light sources having monochromaticity, the colors of RGYB of high chroma saturation can also be displayed with high brightness, thereby a sufficient color reproduction range can be secured. Because the laser light sources have monochromaticity and the color purity of those are quite high, it is possible to display colors of higher color saturation than in the conventional display. Because the colors within the range of video signals and the colors within the range which are daily often seen are, when laser light sources are employed, colors which have mixed the laser light source colors (inside the RGB triangle), it is possible to carry out sufficient reproduction of colors while employing the mixed colors which are obtained by simultaneous emission of the plural colors.

The laser picture formation device of the present invention is characterized in having a modulation element performing video image modulation, and further having four or more color laser light sources having different center wavelengths. While the speckle noises occurring due to the interferences between the laser lights become minute flickers in the light intensity distribution to the viewer, the speckle patterns which occur from the laser lights having different center wavelengths are different, and when different patterns are sensed by the viewer simultaneously, there occur averaging of the flickers, thereby the flicker amount with respect to the total light intensity is reduced. If the sensing of the different patterns are carried out by the viewer even not at the same time but at times which are not distinguished by the viewer, the patterns are sensed with overlapped together, resulting in reduced flicker amount (speckle noises). As compared with the general laser picture formation device comprising RGB three colors, the present invention employing four colors provides an increased number of patterns reduced speckle noises.

It is preferable in the present invention that there are at least BGYR four color laser light sources having center wavelengths of 430 to 475 nm for blue (B), 480 to 560 nm for green (G) and yellowish green (Y) and 610 to 680 nm for red (R).

In the laser picture formation device of the first embodiment, it is preferable that the device has the largeness of the color display range and the brightness which are characteristics of the present invention. In order to realize that, the center wavelength of the laser light of blue (B) is preferred to be 430 to 475 nm that has visibility and has a small CIE chromaticity coordinate y value, and the center wavelength of red (R) is preferred to be 610 to 680 nm that has visibility and has a large chromaticity coordinate x value. Further, since the center wavelengths of the green (G) laser and the yellowish green (Y) laser are of high visibility and the y value of either of the two colors on the chromaticity coordinate is made high and the x value of either of the two colors is made low, the brightness and the largeness of the color display range are obtained. Therefore, the center wavelengths of G and Y are preferred to be 480 to 560 nm. As such, by employing four color laser lights, the color display range is broadened from a triangle in a case of three colors to a rectangle on the chromaticity diagram, thereby the degree of freedom in obtaining colors is increased and a vivid display in colors is enabled.

Figure 2A:
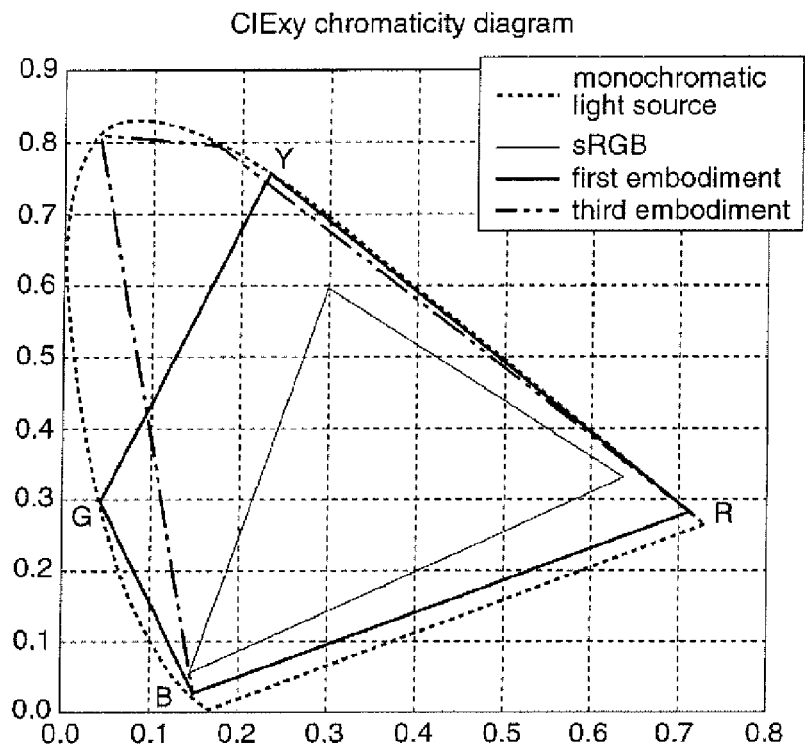
FIG. 2 is a chromaticity diagram showing the color display range in the embodiment of the present invention.
Figure 2B:
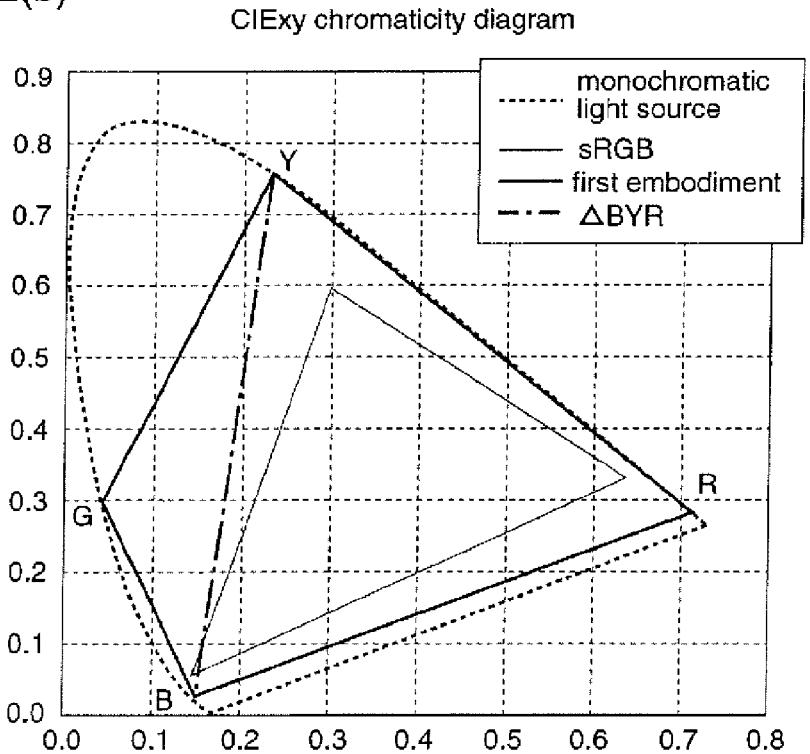

In the first embodiment of the present invention, a semiconductor laser having a center wavelength of 455 nm is employed for B, a wavelength conversion laser having a center wavelength of 490 nm for G, a wavelength conversion laser having a center wavelength of 540 nm for Y, and a semiconductor laser having a center wavelength of 635 nm for R, respectively. The CIE chromaticity diagram illustrating the color display range (fat real line) in the first embodiment is shown in FIG. 2(a). In FIG. 2(a), the sRGB standard range (fine real line) which indicates the display possible range in the conventional CRT is also shown for comparison. In the first embodiment, it is found that the color reproduction of quite wide range is possible. When the color which is pursuant to the video image signal is displayed, it is sufficient if the color reproduction range of the sRGB standard can be displayed. In this first embodiment, since the color reproduction range of sRGB is present inside the RGYB rectangle or inside the ΔBYR (chain line) as shown in FIG. 2(b), the color that has mixed RGYB four colors or BYR three colors of the laser light sources is always displayed. Thereby, it is possible to carry out color reproduction from the monochromaticity of the laser and its wide color display range even when co-using the mixed color which is obtained by simultaneously emitting plural color laser lights. Herein, in order to secure a sufficient color reproduction range, it is preferred that the time during when the plural colors are simultaneously emitted is not longer than the time for the single color emission.

Further, since the laser light source shows the monochromaticity, when the single color (color at each apex of the RGYB rectangle) is displayed, quire a high chroma saturation of color is given, thereby making the viewer relatively brighter. To provide compensation for that, it is required to carry out display for the colors in the vicinity of the apexes of the RGYB rectangle with relatively suppressing the brightness thereof. In this first embodiment, by providing times during when plural color laser lights are simultaneously emitted, the brightness of the monochromatic light is suppressed, thereby enabling a balanced color display.

Since the speckle noises serve as fluctuations in brightness in which the light intensity fluctuations can be seen, they are intensively sensed at wavelengths at which the visibility is high. Therefore, the laser lights of G and Y are preferred to be of the wavelength ranges of 480 to 560 nm at which the visibility is high, and the speckle noise reduction effect is particularly larger than when employing the two colors at the other wavelength ranges. In addition, when two colors for which the center wavelengths of G and Y laser lights are outside the range of 480 to 560 nm are employed, the laser light which has a shorter wavelength than 480 nm is sensed as blue, and the laser light which has a longer wavelength than 560 nm is sensed as yellow. Since the two colors then are of reverse color phases, the speckle noises are recognized as color heterogeneity other than the brightness fluctuations. Therefore, even when the speckle patterns are different from each other and the brightness fluctuations are reduced, the noise reduction effect is gone if it is recognized as color heterogeneity. Therefore, the center wavelengths of the G and Y laser lights are preferred to be within the range of 480 to 560 nm.

In addition, in order to obtain the noise reduction effect, it is preferred that the center wavelengths of those are different from each other by more than 2 nm so that no correlation is present between the G and Y speckle patterns. Further, since if the difference between the center wavelengths of G and Y is large, it is recognized as color heterogeneity even if they are not of reverse phases, the difference between the center wavelengths less than 60 nm. If the difference between the center wavelengths is less than 60 nm within the range of 480 to 560 nm, these speckle patterns are appropriately in color mixing states in which the particles in the vicinity of the resolution of human eyes are mixed, thereby it is not recognized as color heterogeneity.

In the video image formation device 100 of this first embodiment, at least one of the G and Y laser light sources is preferred to be a wavelength conversion laser. The wavelength conversion laser is a laser that has carried out the wavelength conversion of the fundamental wave laser light. As wavelength conversions, there are a two times wave conversion obtaining a ½ wavelength, a three times wave conversion obtaining a ⅓ wavelength, and a sum frequency wave or a difference frequency wave conversion both employing two fundamental waves. For the fundamental wave laser lights, a solid state laser, a gas laser, a fiber laser, and a semiconductor laser may be employed, and a design for quite wide wavelength may be carried out for a wavelength conversion laser. For the G and Y laser lights, it is preferred that a wavelength conversion laser which enables a free wavelength selection for the design of colors and brightness is employed. For other color laser light sources, light sources in general employing laser oscillation, such as a semiconductor laser, a gas laser, a fiber laser, and a solid state laser can be employed.

In addition, it is preferred that the center wavelength of green (G) and yellowish green (Y) are, 480 to 520 nm for G and 520 to 560 nm for Y, respectively. Since the color range which is sensed by the human being is within the horseshoe shape (dashed line) that is represented by the single color light source spectrum on the chromaticity diagram shown in FIG. 2(a), it is required, when four colors are selected, to obtain a color display range which is a rectangle that occupies as wide as possible range within the horseshoe shape. Accordingly, by making the center wavelength of G as 480 to 520 nm and the center frequency of Y as 520 to 560 nm, respectively, it is possible to obtain a wide color display range utilizing the monochromaticity of the laser light and the four colors, and thereby possible to provide vivid images in colors to the viewer, which cannot be obtained previously.

In the laser picture formation device employing four or more laser lights having different wavelengths, the input video signal which is inputted to the laser picture formation device is converted to the output video image control signal for controlling the output of the color number of the laser lights, and the respective colors are controlled according to the output video image control signal. More concretely, even when the input video image signal is one corresponding to three colors, it is converted with broadened to an output video image control signal corresponding to four or more respective color signals. By carrying out modulation with adding gradations to the respective colors, it is possible to carry out a control with broadening the color display range than in the control utilizing three colors, thereby it is possible to produce video images which are more vivid in colors. In addition, when converting the input video image signal of the mixed color having high luminance to an output video image control signal in the laser picture formation device of the first embodiment, it is preferred to carry out a conversion such that the laser light source colors having high visibility are mixed. More concretely, when displaying WHITE in the first embodiment, while it is possible to carry out display by only using three colors of BGR or BYR, the conversion may be carried out such that a display is carried out using all of the BGYR. In other words, even when the same color is displayed, by mixing the laser light source lights having high visibility, the number of speckle patterns which occur on the screen is increased, and thereby the speckle noises can be reduced. It is further preferable that when the conversion to the output video image control signal is carried out, the respective laser light source colors having high visibility are made those which are of the same brightness as much as possible. For example, when WHITE is displayed, the conversion may be carried out so that G and Y colors have the same luminance on the screen.

In the first embodiment, the color within the range of sRGB (fine real line) is included in the ΔBYR (one point dotted line) as shown in FIG. 2(b), and it is possible to display colors within the range of sRGB even if G is not outputted. Herein, as shown in FIG. 2(a), the fat real line of a rectangle shows the color display range in this first embodiment. In the present invention, however, even when a display can be carried out only using three colors of BYR, in order to reduce the speckle noises, the output of the video image signal is converted to four colors with G being added so as to carry out a display in four colors. In addition, similarly to this, even when a display can be carried out only using three colors of BYR, Y is added so as to carry out a display in four colors. In this way, by making a construction in which G is also displayed when Y is displayed and Y is also displayed when G is displayed, it is possible to carry out a display with mixing the laser light sources having high visibility, and thereby reducing speckle noises. In this way, it is preferable that the outputs of both of G and Y may be displayed in the color reproducible range which can be displayed with using both of G and Y. Particularly, it is preferred that when bright video images (such as WHITE) are displayed, the conversion to the four color display signal is carried out such that the luminance components of the respective colors of the pixels which are displayed on the screen are approximately equal to each other for G and Y.

The speckle noise reduction effect is at the largest when the luminance of G and Y displayed are approximately equal to each other. Herein, the luminance approximately equal to each other comprises one being ⅔ to ³⁄₂ of the other. Further, the video image signals of bright video images are those in which the luminance value of the input signal is larger than 0.8 time of the input signal which has the largest luminance.

While in the laser picture formation device employing laser light sources, a method that carries out scanning of the laser light one by one pixel on the screen might have been proposed, the present invention adopts that the video image which is modulated by a two-dimensional or one-dimensional modulation element is projected onto the screen. When the laser light is scanned one by one pixel, the power density becomes high because the converged light is employed for the scanning, and therefore, when the high output, i.e. bright video image is produced, the control becomes very difficult. On the contrary, when a beam which is broadened two-dimensionally or one-dimensionally on the modulation element is employed, a high output power laser light can be easily used, and it is possible to provide bright video images to the viewer. Particularly, when a two-dimensional modulation element is used, it is possible to reduce the power density more than when using a one-dimensional modulation element, resulting in a further easier control. An element using a micro mirror of a two-dimensional array or a two-dimensional array liquid crystal element may be used for the two-dimensional modulation element.

Figure 3:
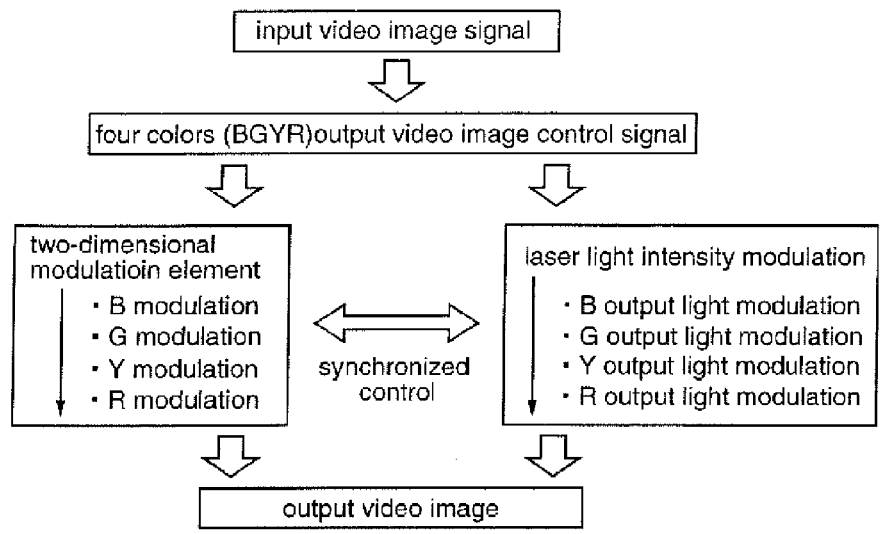
FIG. 3 is a flowchart showing the video image formation method according to the first embodiment of the present invention.

FIG. 3 is a flowchart illustrating a color picture formation method in the laser picture formation device of the first embodiment.

First of all, the input video image signal is converted into the output video image control signal which controls the outputs of the respective color signals of four colors (BGYR). Then, the two-dimensional modulation element is modulated according to the output video image control signal, where the modulation of the emission outputs of the laser lights are independently controlled for respective colors of B, G, Y, R. In the laser picture formation device of this first embodiment, one two-dimensional modulation element is used for the four color laser light sources, the respective laser light emission timings for the respective colors and the respective color video image modulation timings in the two-dimensional modulation element are controlled with synchronized with each other, and thus different colors are successively outputted from the respective laser light sources and the modulation of respective colors by the two-dimensional modulation element are successively carried out, thereby producing color video images.

In the laser picture formation device of the first embodiment, the emission light intensity of the laser light is independently changed for each color and for each frame according to the video image signals. The output video images can be provided in video image representation of gradations of the number that is obtained by multiplying the laser output light intensity and the modulation by the modulation element. For example, when it is supposed that the modulation element carries out a 256 gradation control, and the laser light intensity is controlled in 16 gradation from the minimum to the maximum, a frame can be represented in four colors and 256 gradations, and as a sequence, a video image representation of 4 colors 256×16 (4096) gradations can be realized. In addition, if there are 1000 laser light intensity control width (the maximum/the minimum) and the contrast performance by the modulation element is 1000:1, the contrast of the sequence becomes 10000000:1, thereby resulting in a rich video image representation.

The laser picture formation device of the present invention has characteristics in having a two-dimensional modulation element and controlling the modulation of the light outputs of the laser light sources independently for each color. By performing the modulation of the video image by the two-dimensional modulation element and performing a control thereof independently for each color, it is possible to enrich the color representation as a sequence, and it is also possible to obtain video images of quite high contrast by broadening the control width of the laser light output intensity of respective colors, as described above. Further, as the control of the light outputs of the laser light sources, it may be carried out with adjusted in accordance with such as the viewing environments so as to realize color adjustment of the entire video image or the like, or the light output gradation may be given according to the video image signal. In the present invention, by that the modulation of the laser light outputs of respective colors are carried out independently and that the modulation of video images are carried out by the two-dimensional modulation element, a finer adjustment can be carried out, and video images of a wider contrast can be provided. Since the laser picture formation device of the present invention employs laser light sources, by performing a control of the current and the voltage supplied to the light sources, a high speed and linear output control can be carried out, and as video images, a high speed modulation for each frame or a control of a wide dynamic range is realized.

In the laser picture formation device of the present invention, by controlling the light power modulation of the laser light sources independently for respective colors, it is possible to carry out outputting of the laser light with suppressing the laser light outputs of the respective laser sources according to the video images, thereby realizing reduction in power consumption concerning the light output. In addition, by utilizing the laser light output with suppressing the same, it is also possible to realize a lengthy lifetime of the laser light source. In addition, by performing the modulation of the video image with synchronized with the modulation element, it is possible to increase the gradation number and the contrast of the video images, thereby realizing various video image representation.

In addition, in the first embodiment, the control of the modulation of the laser light source emission power that is independent for the respective colors may be carried out according to the input video image signal and/or the viewing environment. By modulating the emission powers of the laser light sources according to the input video signal, it is possible to realize increases in the gradation number and in the contrast, and further reduction in the power consumption, as described above. Since laser light sources are employed in the present invention, the power modulation of a high frequency is possible, and further, the power modulation for each frame or in a frame, which could not be carried out in such as a lamp type laser light source is enabled.

In addition, by varying the emission power independently for respective colors according to the viewing environment, it is possible to carry out a display with compensating the color variations even when the viewing environment is changed. Since in the present invention it is possible to control, other than the brightness of the monochromatic color, the mixed colors at the simultaneous emission of the plural colors, even if the viewing environment is changed, the color variations can be widely compensated. Further, even when the brightness displayed is to be suppressed in such as a dark viewing environment, it is possible to control the compensation for the color variations by suppressing the emission powers while also realizing reduction in power consumption.

Further, in the first embodiment, an optical integrator and a two-dimensional modulation element are provided for four color laser light sources, and the laser lights are successively emitted to carry out the video image modulation with employing the two-dimensional modulation element in a time divisional manner. When laser light sources of plural colors are employed, if optical parts and modulation elements are prepared for respective colors, there results in a large sized and costly device. In the present invention, it is preferred that the light sources of plural colors successively emit laser lights, and only one light integrator and one two-dimensional modulation element are employed. By commonly employing the optical parts and the modulation elements, the miniaturization and cost reduction of the optical system can be realized.

In the laser picture formation device of this first embodiment, the output video image control signal which is converted from the input video image signal that is inputted to the laser picture formation device includes a signal for performing the modulation by the two-dimensional modulation element for the respective colors and a signal for performing the modulation of the laser light intensity of the respective colors. According to such a construction, a combined modulation that has combined the modulation of the two-dimensional modulation element and the modulation of the laser light intensity can be carried out, and output video images having a rich color representation and a high contrast can be obtained.

The color picture formation method of this first embodiment has characteristics in producing video images by synchronously performing the modulation of the video images by the two-dimensional modulation element and the modulation of the laser light outputs of four colors according to the input video image signal. By employing such a method, it is possible to obtain color video images which are of a wide color display range, vivid, and of a high contrast.

The laser picture formation device of the present invention is preferred to be provided with, in addition to the four color laser light sources, a speckle noise removal means. By being provided with the speckle noise removal means, it is possible to remove the speckle noises which would reach the viewer more efficiently. In the first embodiment, there is provided an element (particularly, a rotating renticular lens) which varies the deflection angle of the beam in view of time. As a speckle noise removal means, a means for varying the deflection angle of the light irradiated to the two-dimensional modulation element or a means for broadening the spectrum width and the light source area of the laser light may be employed.

As described above, according to a laser picture formation device of this first embodiment, in a laser picture formation device having laser light sources and a two-dimensional modulation element that carries out video image modulation, four color laser light sources (101R, 101G, 101Y, and 101B) of red (R), green (B), yellowish green (Y), and blue (B) having different center wavelengths are employed, and particularly, the laser lights of G and Y which are laser light source lights of high visibility are simultaneously emitted and displayed. Therefore, the speckle noises at the wavelength range having high visibility can be reduced.

Further, since the difference between the center wavelengths of laser light sources of G and Y (101G, 101Y) is made above 2 nm and below 60 nm, it is possible to reduce the speckle noises at the wavelength range that has high visibility, and also it is possible to display the video images having no color heterogeneity.

Further, since the outputs of both of G and Y are designed to be displayed at the color reproduction range within which the display can be carried out by using both of G and Y, the speckle noises at the wavelength range having a high visibility can be reduced.

Further, since the modulation of the laser light outputs of the laser light sources are independently controlled for respective colors, a finer adjustment can be carried out according to the video images, and video images having a wide contrast can be provided.

Further, since the video image modulation by a single two-dimensional modulation element 107 and the laser light output modulation of four colors are carried out with synchronized with each other, to form video images, the gradation number and the contrast of the video images can be increased and various video image representation can be provided.

Second Embodiment

A laser picture formation device of a second embodiment is one that is obtained by modulating the division times which are modulation times of the two-dimensional modulation element for the respective colors while performing video image modulation for the lights from the respective laser light sources.

Figure 4:
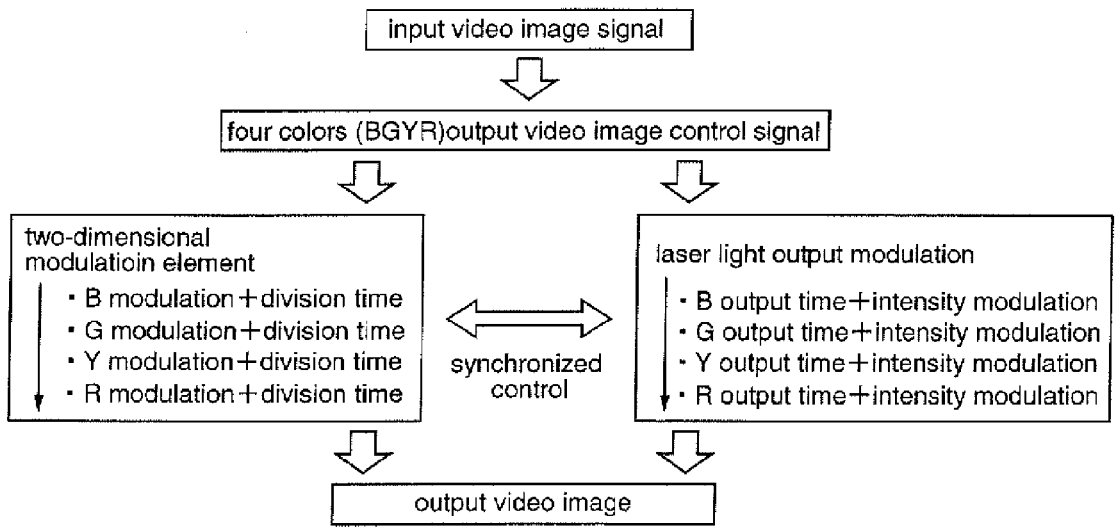
FIG. 4 is a flowchart showing the video image formation method according to the second embodiment of the present invention.

FIG. 4 is a diagram illustrating a flowchart of a color video image formation method in the laser picture formation device of the second embodiment. The construction of the laser picture formation device of this second embodiment is the same as that of the laser picture formation device 100 in the first embodiment.

In the laser picture formation device of the second embodiment, the division times for the modulation operations of the two-dimensional modulation element for respective colors are modulated according to the input video image signal which is inputted to the laser picture formation device. More concretely, when it is supposed that one frame is $1/60$ sec, it is controlled such that the respective division times for blue (B), green (G), yellowish green (Y), red (R) are controlled to be ($1/240$, $1/240$, $1/240$, $1/240$) in a frame A, and to be ($1/480$, $1/480$, $1/240$, $1/120$) in another frame B. Simultaneously, in the laser light output modulation, it is controlled such that the laser light emission times are included in the respective division times for the video image modulation by the two-dimensional modulation element, and at the same time, the laser light intensity are modulated independently for respective colors.

In the second embodiment of the present invention, it is desirable that the division times for the operations of the two-dimensional modulation element for the laser light sources of respective colors are modulated according to the input video image signal. By modulating the division times, it is possible to vary the gradation number of the respective colors for each frame, and it is possible to broaden only the gradation number of necessary colors. For example, in the scene of sunset glow, a finer representation of red color is enabled by increasing the division time for red (R) thereby to increase the gradation number of red.

In addition, the output video image control signal which is converted from the input video image signal is preferred to include a signal for performing the modulation by the two-dimensional modulation element as well as a signal for modulating the laser light emission time, similarly as in the first embodiment. By carrying out modulation of the laser light emission time, it is possible to carry out the laser light output modulation even at a constant intensity. More preferably, the laser light emission time is modulated with synchronized with the respective division times for the video image modulation by the two-dimensional modulation element. According to such a construction, it is possible to utilize the respective division times for the video image modulation by the two-dimensional modulation element with no waste.

Figure 5A:
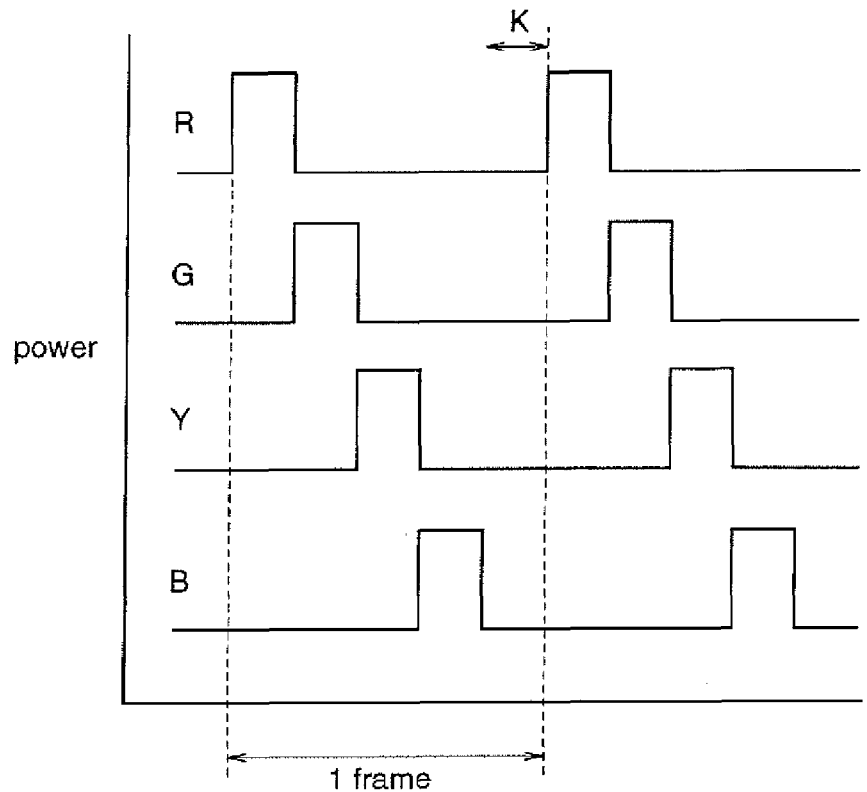
FIG. 5 is a diagram illustrating a laser light emission timing in the laser picture formation device according to the second embodiment of the present invention.
Figure 5B:
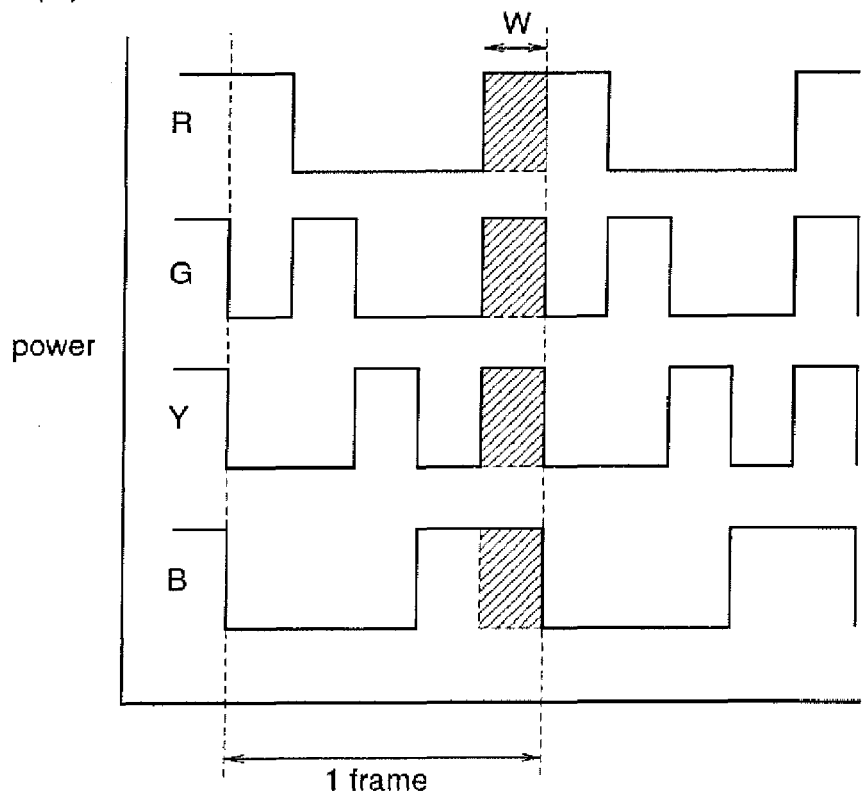

FIG. 5 is a diagram illustrating another example of a laser emission pattern in the laser picture formation device of this second embodiment.

For example, in a case of a scene where the input video image signal is dark, the respective colors are successively emitted and further, periods k during which the outputs of all the colors are made low are provided as shown in FIG. 5(a), while in a case of a scene where the input video image signal is bright, the plural colors (four colors in the figure) are simultaneously emitted and further, periods w during which the pattern of the mixed color is emitted are provided. During the period when the pattern of W (White) which is the mixed color is being emitted, the modulation element also carries out modulation of the video images according to the W. Then, the input video image signal is converted into the five color correspondence of R, C, Y, B, W, thereby producing video images of respective colors. The display pattern during the period w during when the plural laser lights are emitted is subjected to signal conversion so as correspond to the brightness of the pixels.

In the second embodiment, it is desirable that at least two colors of G and Y are simultaneously emitted in the period during which plural colors are emitted similarly as in the first embodiment. To the pixels for which bright video image signals are displayed, the outputs of two colors of G and Y in the plural color emission periods can be surely added, and thereby, displays for pixels for which the video image signals which are bright and have eminent speckle noises are made displays having combined the outputs of two colors of G and Y efficiently, resulting in reduced speckle noises.

Figure 6:
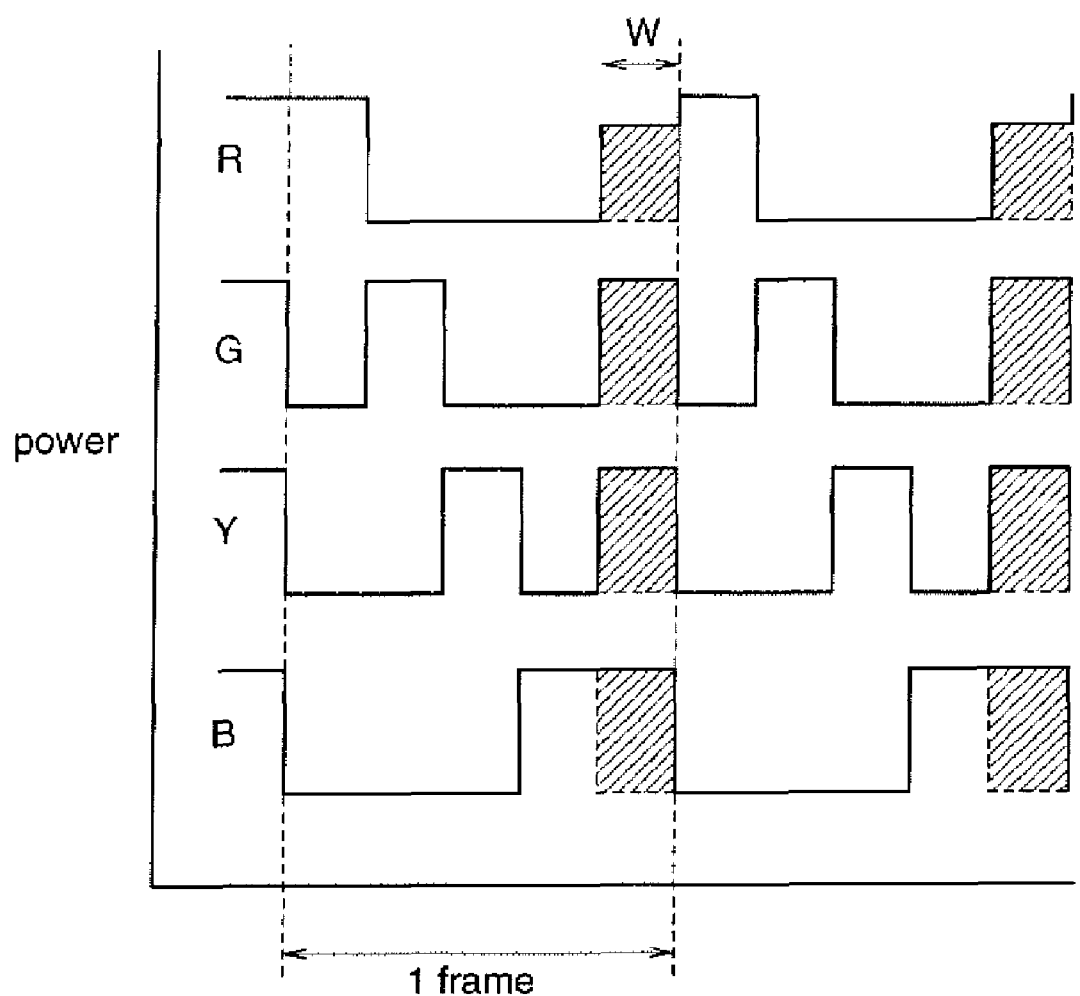
FIG. 6 is a diagram representing the laser light emission timing in a case where the output power modulation in the time during when the plural colors are emitted simultaneously and the output power modulation in the time during when only one color is emitted are controlled independently.

Further, in this second embodiment, it is preferred that the combination of R and G and that of Y and B which have color phases approximately reverse to each other, respectively, are emitted successively, thereby the fluctuations in colors due to the successive emission are alleviated. In addition, emitting G and Y colors successively as shown in FIG. 6 makes obtaining the speckle noise reduction effect easy, and this provides a preferable embodiment. More concretely, it is preferred to carry out successive emission as R-G-Y-B- . . . or as B-Y-G-R- . . . , as shown in FIG. 5(a). In addition, periods during which the plural color emission is carried out or the output power reduction is carried out may be inserted between the respective successive emissions.

Further, since in the second embodiment the modulation element and the laser light sources carry out the modulation with taking synchronization also for the mixed color that is obtained by emitting plural colors simultaneously, if the emission power modulation when the light emission from the other laser light source is also performed simultaneously is controlled independently from the modulation when the single color light emission is carried out in the respective laser light sources, it is possible to control the emission power ratio (mixing ratio) at performing the simultaneous emission while carrying out power modulation of the single color.

FIG. 6 is a diagram illustrating laser light emission timings in a case where the emission power modulation during a time when the plural colors are simultaneously emitted and the emission power modulation during a time when only a single color is emitted are independently controlled. In this example, the color temperature of the video images is adjusted by the WHITE that is obtained by simultaneous emission of the four colors.

In FIG. 6, a video image in which the proportion of Red is lowered and the color temperature is raised is illustrated. In the present invention, by varying the mixing ratio of the powers which are simultaneously emitted, it is possible to correspond to changes of the viewing environment such as the color temperature or the changes by favors of the viewer. In the example of FIG. 6, by only changing the emission power ratio when emitting the four colors simultaneously, it is possible to adjust the color temperature with maintaining the power when the emission is performed for any single color of RGYB. In addition, while in this second embodiment, an example in which the emission power ratio is varied when displaying the WHITE, the power mixing ratio may be controlled according the viewing environment and favors of the viewer also in a case where the plural colors other than obtaining the WHITE are emitted.

As described above, according to the laser picture formation device of this second embodiment, in a laser picture formation device having one optical integrator and one two-dimensional modulation element, the two-dimensional modulation element is employed with dividing in time its video image modulation for the plural color laser light sources, and the respective division times of the two-dimensional modulation element are modulated according to the input video signal. Therefore, the gradation number of the respective colors can be varied for each frame, and only the gradation numbers for necessary colors can be broadened.

In addition, a display employing four color laser lights including G and Y is performed for pixels for which bright video image signals are displayed such as the WHITE, and thus a display for pixels for which bright video image signals including eminent speckle noises are displayed is made a display having mixed two colors of G and Y efficiently, thereby the speckle noises can be reduced.

Further, since the modulation of emission powers during when plural colors are simultaneously emitted and the modulation of the emission power during when only a single color is emitted are independently controlled, it is possible to carry out adjustment of the color temperature, with maintaining it as it is when the single color emission is performed.

Third Embodiment

A laser picture formation device according to a third embodiment of the present invention is constituted so as to employ four color laser light sources in a laser picture formation device which employs three optical integrators and three two-dimensional modulation elements.

Figure 7:
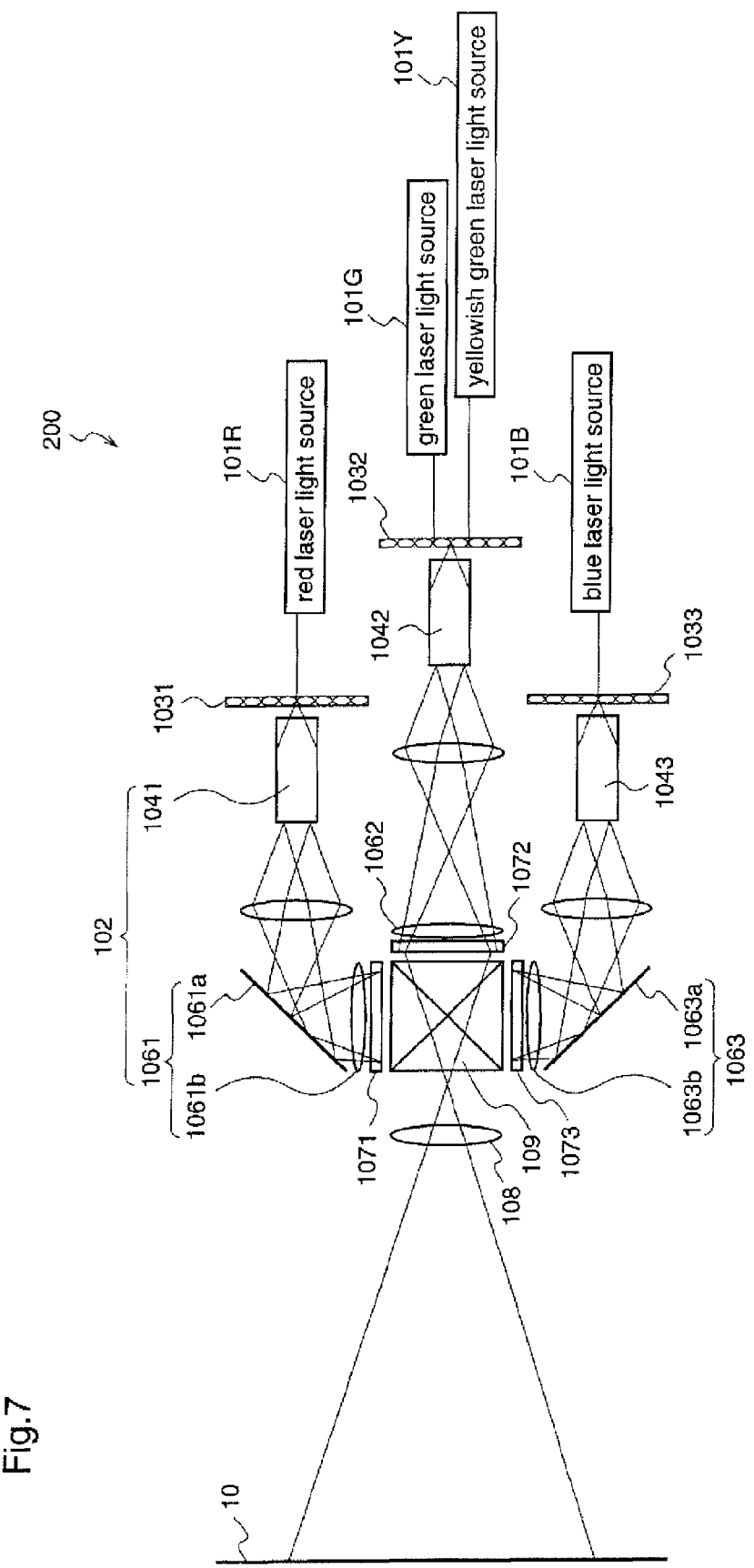
FIG. 7 is a schematic view of the laser picture formation device according to the third embodiment of the present invention.

FIG. 7 is a schematic diagram illustrating a laser picture formation device according to a third embodiment of the present invention. In FIG. 7, the same constitutional elements as in FIG. 1 are denoted by the same reference numerals.

The laser picture formation device 200 of this third embodiment includes three optical integrators 1041-1043, three two-dimensional modulation elements 1071-1073, and four color laser light sources (101R, 101G, 101Y, 101B). In this third embodiment, the green laser light source 101G and the yellowish green laser light source 101Y make a set, and share a pair of the optical integrator 1042 and the two-dimensional modulation element 1072. The two-dimensional video image modulation elements 1071-1073 are transparent type two-dimensional modulation elements, each particularly consisting of a combined liquid crystal element array and optical deflection element. Blue (B) and red (R) laser light sources have respective pairs of optical integrators 1041 and 1043 and two-dimensional modulation elements 1071 and 1073, and the four color laser lights are subjected to an integrative addition color mixing, thereby producing video images vivid to the viewer.

The irradiation optical system 102, which includes speckle removal means 1031-1033, optical integrators 1041-1043, and projection optical systems 1061-1063, makes the lights from the laser light sources subjected to the beam formation and homogenization, the resulted beam irradiating the two-dimensional modulation elements 1071-1073. In this third embodiment, the lights from the three two-dimensional modulation elements 1071-1073 are synthesized by a dichroic prism 109, and the synthesized light is broadened and projected onto the screen 10 by the projection optical system 108 as color video images.

In this third embodiment, a semiconductor laser having a center wavelength of 455 nm is employed for 101B, a wavelength conversion laser having a center wavelength of 515 nm for 101G, a wavelength conversion laser having a center wavelength of 532 nm for 101Y, and a semiconductor laser having a center wavelength of 635 nm for 101R, respectively. The color display range of this third embodiment is shown in FIG. 2(*a*). In this third embodiment, similarly as the color display range of the first embodiment (shown by a thick full line in FIG. 2(*a*)), a color display of quite wide range (chain double-dashed line) that is broader than the sRGB standard range (fine full line) can be carried out. In addition, similarly as in the first embodiment, by the laser light original colors of G and Y being overlapped, speckle noises are reduced.

In this third embodiment, the video image modulations of green (G) and yellowish green (Y) are carried out with commonly using the two-dimensional modulation element 1072 and employing, for example, a first modulation method or a second modulation method as described in following a), b). Here, the input video image signal which is inputted to the laser picture formation device is converted into the output video image control signal for controlling the outputs of the four color signals similarly as in the first embodiment.

a) First Modulation Method

The video image signal modulation patterns by the two-dimensional modulation element for G and Y are the same patterns, and thereby one video image modulation patter is given for the laser light output of the sum of G and Y.

Figure 8A:
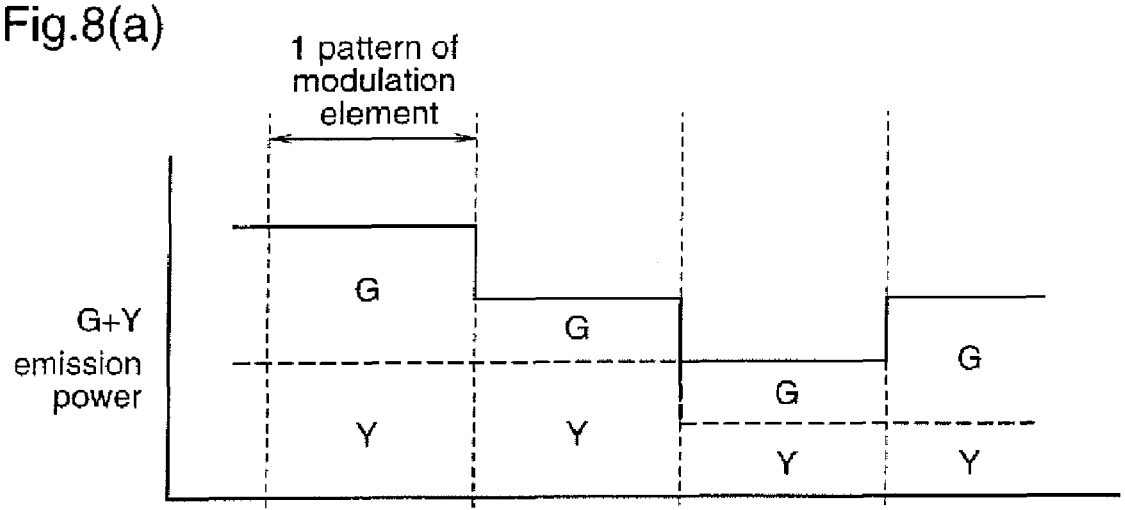
FIG. 8 is a diagram illustrating the G and Y laser light outputs in the laser picture formation device according to the third embodiment of the present invention.
Figure 8B:
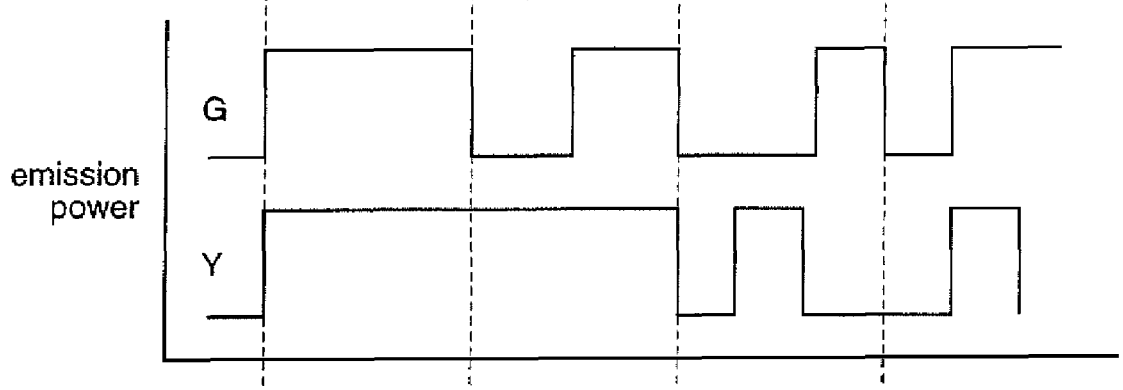

An example of the laser light outputs of G and Y is shown in FIG. 8. In FIG. 8, during a period of one video image modulation pattern, the light of the sum of G and Y irradiates the modulation element.

First of all, FIG. 8(*a*) is a diagram illustrating an example in which the control of the outputs of G and Y which irradiate one video image modulation pattern and the ratio thereof are carried out according to the ratio between the laser emission powers. In the example of FIG. 8(*a*), the laser emission power ratio of G and Y and those outputs are varied for each video image modulation pattern, and by varying the outputs and colors irradiating the modulation element, a color display of a wide range, and a high contrast and a multi gradation are preferably enabled. For bright video image signals, the outputs of G and Y are given as high, and the modulation elements are irradiated such that the luminance of G and Y are approximately equal to each other. By such a modulation method, it is possible to make the luminance ratio of G and Y which are displayed approximately equal to each other for the bright pixels which are displayed, thereby reducing the speckle noises.

FIG. 8(*b*) is a diagram illustrating an example in which the control of the outputs of G and Y which irradiate one video image modulation pattern and the ratio thereof are carried out according to the pulse width of the laser light emission. In the example of FIG. 8(*b*), in order to obtain a high average output in one video image modulation pattern for bright video image signals, the emission time proportions of G and Y during the one video image modulation pattern are increased, and further, the laser light emission powers are controlled such that the luminance of G and Y in the one video image modulation pattern are approximately equal to each other.

In this way, the first modulation methods shown in FIGS. 8(*a*) and 8(*b*) are methods which can carry out a display for bright pixels with a preferable luminance ratio between G and Y by irradiating the one video image modulation pattern of the video image modulation element with the output light of the sum of G and Y.

The output video image control signal of G and Y include the same modulation signals of the two-dimensional modulation elements, and the signals of the respective laser light outputs.

While in FIGS. 8(*a*) and 8(*b*), examples in which the outputs and the ratio of the G and Y are varied for each pattern of the modulation element according to the input video image signal or the like, the outputs and the ratio of G and Y may be varied at the switching of the display mode or the like, or the outputs and the ratio of G and Y may be made always constant. When the outputs and the ratio of G and Y are made constant, the laser light output signals of G and Y may be made the same.

b) Second Modulation Method

The video image modulation of the two-dimensional modulation element is carried out in a time divisional manner for G and Y similarly as in the first and second embodiments, thereby modulating the two colors. The output video image control signals for G and Y include respectively modulation signals of the two-dimensional modulation element and the laser light output modulation signals, and thereby the laser lights of G and Y are emitted with synchronized with the timings of the video image modulation which are time divided for the two-dimensional modulation element. The laser light output modulation may be carried out as modulation of either of the laser light intensity and the emission time, or as modulation of both. When the laser emission time is modulated, the respective division times for the video image modulations by the two-dimensional modulation element may be modulated with synchronized with that. Thereby, it is possible to carry out a color display of a wide range even within a frame, thereby a further preferred modulation method is obtained.

Figure 9:
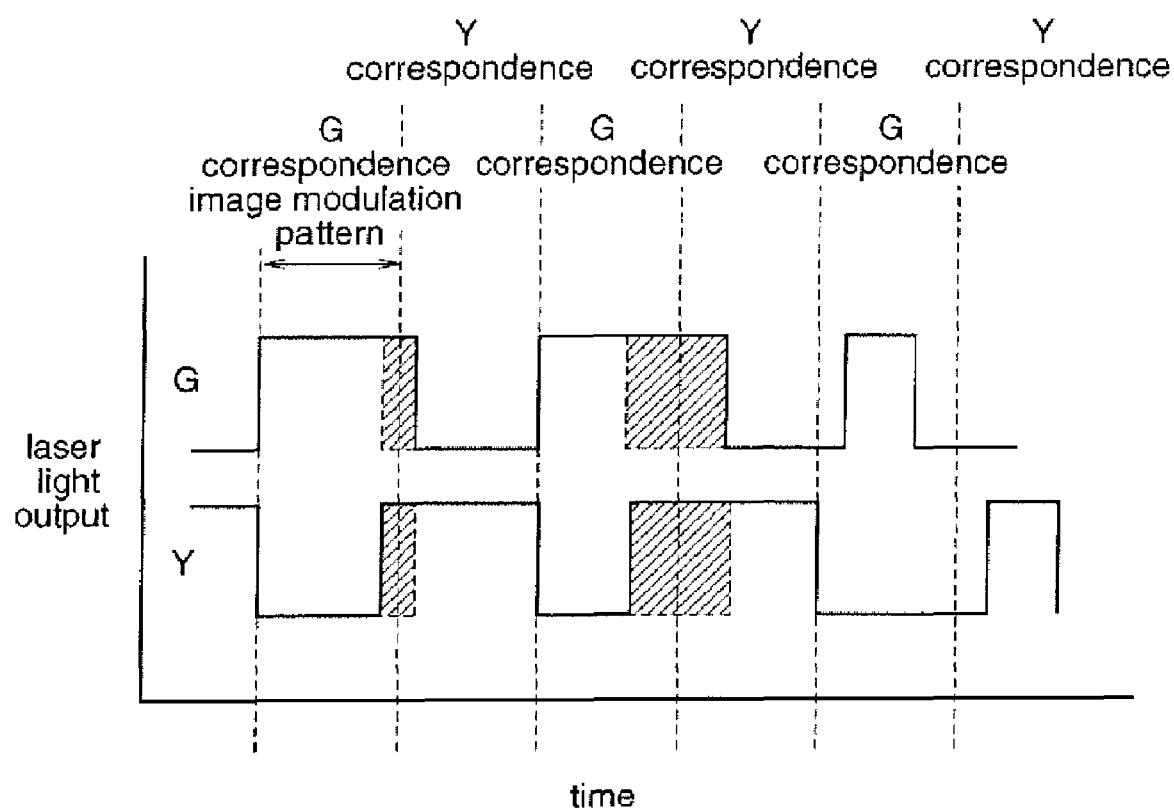
FIG. 9 is a diagram illustrating examples in which the laser light emission times are modulated in the laser picture formation device according to the third embodiment of the present invention.

FIG. 9 is a diagram illustrating an example where the emission times of the laser lights are modulated with maintaining the division timings of the two-dimensional modulation elements as they are. When the video image modulation pattern of the two-dimensional video image modulation element is a G corresponding pattern, the Y laser light is emitted to irradiate the two-dimensional modulation element. Similarly, when the video image modulation pattern is a Y corresponding pattern, the G laser light is emitted to irradiate the two-dimensional modulation element. The example shown in FIG. 9 is a preferred modulation method that can output the laser lights of G and Y simultaneously for the pixels displayed at either of the G and Y modulation patterns by the outputs of Y and G being added, respectively. Further, in the second modulation method, the emission time of the laser light that is added when either of the G and Y modulation patterns is employed is varied according to the input video image signal, thereby controlling the laser light output. Then, for a bright scene, the laser light output to be added is made a lot, thereby providing compensation such that the luminance displayed on the screen should be the maximum luminance, and for a bright pixel, the output of G+Y laser light is always added thereto, thereby reducing the speckle noises.

While in the second modulation method, the laser light output which is added to either of G and Y patterns is varied dependent on the input video signal and the mode for display, the laser light output that is added to either pattern may be made constant.

In addition, in the laser picture formation device of the third embodiment, while the two-dimensional modulation element 1072 is shared for green (G) and yellowish green (Y), the modulation of the two-dimensional modulation element and the modulation of the laser light output are controlled independently for the color of red (R) and for the color of blue (B), respectively.

In addition, similarly as in the color picture formation method of the first embodiment, the video image modulation by three two-dimensional modulation elements and the modulation of the four color laser light outputs may be carried out with synchronized with each other, thereby to form video images. By employing such a method, it is possible to obtain color video images which have a wide color display range, and which are vivid and have a large contrast.

As described above, according to the laser picture formation device of the third embodiment, by commonly using one optical integrator 1042 and one two-dimensional modulation element 1072 for the laser light sources of G and Y, it is possible to employ four color laser lights even in a construction having three modulation elements 1071 to 1073 and three optical integrators 1041 to 1043. Thereby, it is possible to reduce the speckle noises of a high visibility and it is possible to realize a profound video image display having a wide color display range.

Fourth Embodiment

A laser picture formation device according to a fourth embodiment of the present invention is constructed such that the emission times of the laser lights and the respective division times of the two-dimensional modulation elements for the vide image modulation are controlled according to an output of a laser light source monitor and the display mode so as to provide compensation for variations in the brightness or colors of video images in the second embodiment of the present invention.

FIG. 10(a) illustrates an example where the emission time is controlled according to the signal outputted from the light source monitor for the red laser light source 101R. The laser light source monitor monitors the laser light output, the emission wavelength, and the like. For the red laser light source 101R of the laser picture formation device, a monitor (not shown) which monitors the power and the wavelength with employing a diffraction grating and a two-piece division photo detector is mounted. In FIG. 10(a), it is monitored by a laser light source monitor that the wavelength of the red laser light source 101R is shifted toward the longer wavelength side due to a temperature variation, and according to the monitored result, a control of the emission time with relative to the initial setting is carried out, thereby variations in the color and the brightness of images are compensated. The variations in the visibility and in the chromaticity coordinates due to that the emission wavelength of the red laser light source 101R is shifted toward the longer wavelength side are compensated by that the emission time of the single R color and the simultaneous emission time of the plural colors are controlled. Herein, the respective division times for the video image modulation by the two-dimensional modulation elements may be preferably modulated with synchronized with the laser light outputs after the emission time control being performed, according to the laser light source monitor.

FIG. 10(b) illustrates an example where a control of the emission time is performed when the display mode is set to one that displays the white color luminance with priority. If the time for emitting the plural colors simultaneously is increased according to the set display mode, it is possible to display the white color luminance at bright even by employing the same peak powers of the laser light sources. In the example of FIG. 10(b), it is possible to display the white luminance brighter by 10% with relative to the initial setting. In addition, by increasing the simultaneous emission times of the plural colors similarly as in the control shown in FIG. 10(b), it is possible to suppress the peak power of the laser light source and to select such as the mode that places priority on the lifetime reliability of the laser light source even under the same white color luminance. Herein, the respective division times of the two-dimensional modulation element for its video image modulation may be preferably modulated with synchronized with the laser light output after the control of the emission times being performed according to the set display.

In addition, when it is detected by the laser light source monitor that the light source power of any of the respective color laser light sources is deteriorated, it is possible to carry out compensation for brightness and colors by controlling the emission time similarly as described above. In addition, also when the power deterioration of the all color laser light sources are detected by the laser light source monitors, it is possible to compensate for brightness by increasing the time widths during which the simultaneous emission is performed.

As described above, according to the laser picture formation device of the fourth embodiment, the emission times during when the laser light sources successively emits with a single color or plural colors, and the division times for the video image modulation by the two-dimensional modulation elements are controlled according to the laser light source monitor or the display mode, thereby the adjustment in brightness and colors of the video images can be carried out, and thereby it is possible to provide compensation for cases where the brightness or colors in the video images are changed.

Further, in the present invention, if adjustment is carried out not only for single colors of RGYB but for the mixed color that comprises plural colors being simultaneously emitted, a finer adjustment is possible.

Further, in this fourth embodiment, by detecting the power or the wavelength by the laser light source monitor, it is possible to carry out adjustment for the compensation for in a case where the wavelength is changed, without unreasonably raising the laser output.

Further, by controlling the emission times for successive emission, it is possible to provide video images of image quality that is preferred by the viewer.

Fifth Embodiment

A laser picture formation device according to a fifth embodiment of the present invention is constructed so as to control the color display range according to the viewing environment, in order to prevent reduction in the chroma saturation of a color due to variations in the viewing environment in the laser picture formation device according to the first to fourth embodiments.

The color adjustment method according to the viewing environment in a laser picture formation device having RGYB four color laser light sources and a modulation element will be described with employing the laser picture formation device 100 of the first embodiment. The laser picture formation device 100 is capable of displaying the colors inside the RGYB rectangle (thick full line) as shown in the color displayable range on the CIExy chromaticity diagram shown in FIG. 2.

Figure 11:
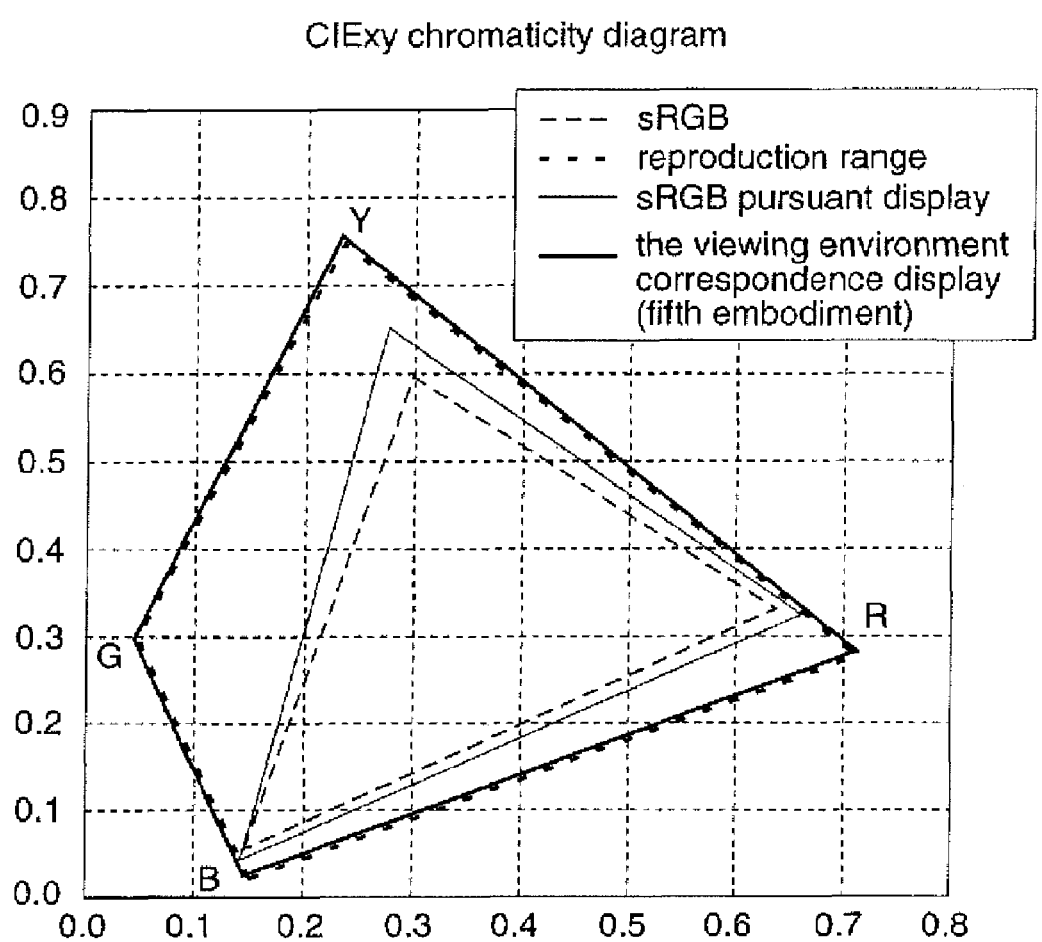
FIG. 11 is a chromaticity diagram illustrating the color display range in the laser picture formation device of the present invention.
Figure 12:
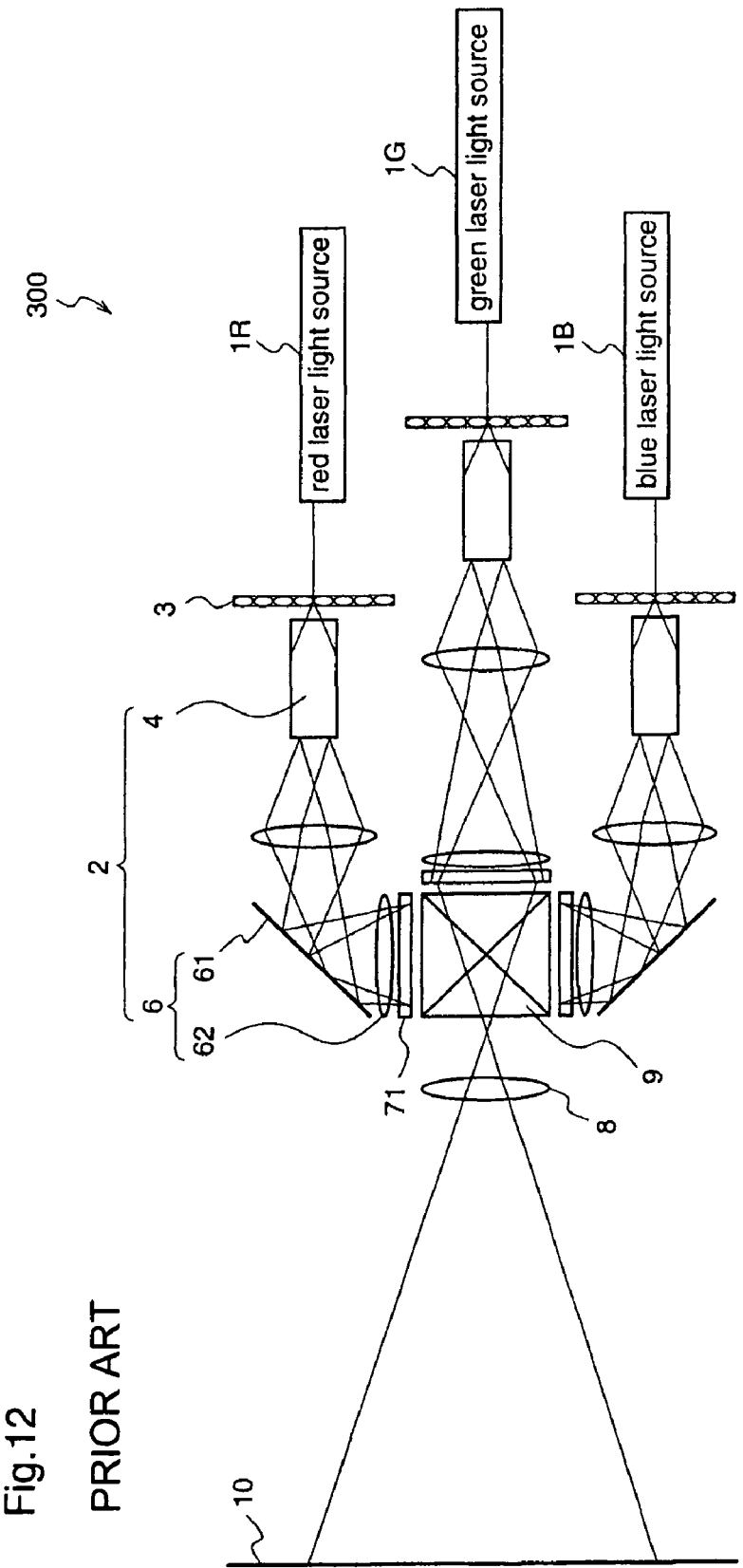
FIG. 12 is a schematic diagram illustrating a conventional laser picture formation device.

When the input video signal of sRGB standard is normally displayed, the color display is carried out pursuant to the reference chromaticity of the sRGB. FIG. 11 shows an example of such a color display.

In FIG. 11, when it is within the sRGB pursuant display (fine full line), display is carried out in a range where such as hue is not deviated from the input signal and within a range that encloses the color reproducible range (fine dashed line) of sRGB according to the reference chromaticity of sRGB. In performing the sRGB pursuant display, in order to take advantage of the color displayable range of a laser, the display may be carried out with making the chroma saturation of a color higher than in the conventional display within a range where hue is not deviated.

The laser picture formation device of this fifth embodiment has characteristics in controlling the color display range in the chromaticity coordinate according the viewing environment. In other words, when the viewing environment becomes brighter with relative to the normal display, if the same display of video images as in the conventional is carried out, it is seen as if the chroma saturation of a color has been lowered because the irradiation light enters the eyes of the viewer. In this fifth embodiment, when the viewing environment has become brighter, the color display range is controlled to be larger than usual. That is, when it is seen as if the chroma saturation of a color has been lowered by such as irradiation light, the color display range is made one that is pursuant to the displayable range (thick dashed line). For example, when the input video signal of sRGB standard is displayed, it is controlled from the sRGB pursuant display to the viewing environment correspondence display according to the viewing environment. By this control, even if the viewing environment changes and the bright irradiation light enters the eyes of the viewer, it is possible to display a color of high color saturation. Since the laser picture formation device of the present invention has monochromaticity of the laser light source, it is possible to carry out a display of quite high color saturation. Even when the same input video image signal is received, by carrying out a display of quite high color saturation utilizing the monochromaticity, it is possible to compensate for the reduction of the color contrast.

Herein, the changing of the chromaticity of the video images to be displayed may be processed when converting the input video image signal into the output video image control signal for controlling the modulation element and the laser light source power. The changes in the viewing environment may be controlled according to a detection signal that is obtained by a viewing environment monitor (not shown) provided at such as the display surface of the laser picture formation device, or may be carried out by the viewer at appropriate timings.

In addition, in the laser picture formation device of the present invention, it is preferable that the power control of the laser light source is accompanied for the change in the color display range due to the change in the viewing environment. For example, when the irradiation light is extremely bright, by raising the power of the laser light source to a higher value than usual, it is possible to further suppress the reduction in the color contrast. In addition, even when the irradiation light is not white light but colored irradiation, since the laser picture formation device of the present invention has independent laser light sources of RGYB, it is possible to control only the laser light source of a particular color and thereby suppress the reduction in the color contrast for any colors. Here, when the viewing environment is dark, it is possible to realize electric power saving while suppressing the power of laser light sources and making the colors sensed by the viewer fixed.

As described above, according to the laser picture formation device of the fifth embodiment of the present invention, when the chroma saturation of the color is seen as degraded due to that the viewing environment has become brighter, the color display range is switched to the viewing environment corresponding display from the sRGB pursuant display as usual display, thereby preventing reduction in the color saturation of the color due to variations in the viewing environment.

While in the above-described fifth embodiment, the laser picture formation device 100 of the first embodiment is employed for the description, it is also possible to carry out a control of the color display range according to the viewing environment similarly in the laser picture formation device 200 of the third embodiment.

In addition, in the laser picture formation device of the first to fifth embodiment, when modulating the emission power of the laser light source according to the input video image signal or the viewing environment, the laser cooling temperature is also preferably controlled at the same time. Particularly, when the laser light source power is continuously outputted at a high power, the cooling temperature is controlled to be low. By controlling the cooling temperature accompanying the control of the laser light source emission power modulation, it is possible to secure the high reliability of the laser light source, and further possible to output the laser light at high efficiency. In addition, when performing a video image display having suppressed the laser light source output, if the cooling temperature increased to higher than usual, the cooling power can be suppressed and results in a further electrical power saving.

For the laser light sources in the laser picture formation device according to the first to fifth embodiments, light sources which occur laser oscillations such as a semiconductor laser, a wavelength conversion laser, a solid state laser, and a gas laser may be employed. Further, a laser light source of one color may be constituted by a plurality of lasers.

In addition, since the laser picture formation devices of the first to fifth embodiments utilize monochromaticity of the laser light sources, they are preferred to have monochromaticity also including cases where, for example, a laser light source of one color comprises plural lasers of the same color. Also including cases where laser light source of the same color each comprise a plurality of lasers, it is preferred that the spectrum half value total width of each color of the laser light sources of RGYB four colors is less than 10 nm. If it has the half value total width less than 10 nm, it is possible to employ the same in the laser picture formation device of the present invention with taking advantage of nonochromaticity (a narrow spectrum width) with relative to the conventional light sources. More preferably, the spectrum half value total width of each of RGYB four color laser light sources is less than 5 nm. If it is less than 5 nm, the chromaticity control of the respective colors can be easily realized.

In addition, the projection optical system and the screen for projecting the video images of the modulation element in the laser picture formation device of the first to fifth embodiments are not limited to those in the embodiments, and those which make the images of the modulation element visible to the viewer may be employed. The screen may be a reflection type which is called as a front projection type, or a transparent type which is called as a rear projection type. In addition, the type of a liquid crystal display having a display surface comprising a modulation element, without having a projection optical system, may be employed.

In addition, while in the first to fifth embodiments, laser light sources of four colors having different center wavelengths are employed, the present invention is not limited thereto. Five or more colors can be employed While in the laser picture formation device of the first to fifth embodiments, the laser light sources of four colors having different center wavelengths are employed, the laser picture formation device in which the modulation control of the two-dimensional special modulation elements and/or of the respective laser light sources in the first and second embodiments are employed, and those in which three color laser light sources are employed relating to the fourth and the fifth embodiment rare also applicable.

APPLICABILITY IN INDUSTRY

The laser picture formation device and the color picture formation method of the present invention can be utilized as a picture formation device and a method of forming a moving picture or a still picture.

The invention claimed is:
1. A laser picture formation device comprising laser light sources and a two-dimensional modulation element which carries out modulation of video images, wherein
there are provided BGYR four color laser light sources where the center wavelength of B is 430 to 475 nm, the center wavelengths of G and Y are 480 to 560 nm, and the center wavelength of R is 610 to 680 nm;
at least one of the G and Y laser light sources is a wavelength conversion laser; and
the difference between the center wavelengths of the G and Y laser light sources is larger than 2 nm and smaller than 60 nm.

2. A laser picture formation device as defined in claim 1, wherein
the center wavelengths of G and Y among the BGYR four color laser light sources are G: 480 to 520 nm and Y: 520 to 560 nm, respectively.

3. A laser picture formation device as defined in claim 1, wherein the input video signal which is inputted to the laser picture formation device is converted into an output video control signal for controlling the outputs of the four or more respective color signals.

4. A laser picture formation device as defined in claim 1, wherein the modulation of the laser lights which are outputted from the four or more laser light sources are controlled independently for respective colors.

5. A laser picture formation device as defined in claim 4, wherein the modulation of the emitted powers from the respective color laser light sources are controlled independently for respective colors dependent on the input video signal and/or the auditory environments.

6. A laser picture formation device as defined in claim 5, wherein the laser cooling temperature is controlled accompanying with the emission power modulation of the laser light source.

7. A laser picture formation device as defined in claim 4 wherein,
the output video image control signal for controlling the outputs of the four or more respective color signals which are converted from the input video signal includes at least the modulation signal for the two-dimensional modulation element and the modulation signal for modulating the laser light intensity.

8. A laser picture formation device as defined in claim 4 wherein,
the output video image control signal for controlling the outputs of the four or more respective color signals which are converted from the input video signal includes at least the modulation signal for the two-dimensional modulation element and the modulation signal for modulating the laser light emission time.

9. A laser picture formation device as defined in claim 8 wherein, the laser light emission time is synchronously modulated with the video image modulation in the respective division times by the video image modulation of the two-dimensional modulation element according to the input video signal.

10. A laser picture formation device as defined in claim 4 wherein
said laser picture formation device has one two-dimensional modulation element, and employs said one two-dimensional modulation element for the laser lights from the four or more respective laser light sources with carrying out time division of the video image modulation by the two-dimensional modulation element.

11. A laser picture formation device as defined in claim 1, wherein
said laser picture formation device has one two-dimensional modulation element, and employs said one two-dimensional modulation element for the laser lights from the four or more respective laser light sources with carrying out time division of the video image modulation by the two-dimensional modulation element.

12. A laser picture formation device as defined in claim 11, wherein the respective division times for the video image modulation by the two-dimensional modulation element are modulated according to the input video signal.

13. A laser picture formation device as defined in claim 11, wherein the respective division times for the video image modulation by the two-dimensional modulation element are modulated according to the output of the laser light source monitor which monitors the laser light emitted from the laser light source and/or the display mode that is set.

14. A laser picture formation device as defined in claim 11 wherein, the output video image control signal for controlling the outputs of the four or more respective color signals which are converted from the input video signal includes at least the modulation signal for the two-dimensional modulation element and the modulation signal for modulating the laser light intensity.

15. A laser picture formation device as defined in claim 11 wherein,
the output video image control signal for controlling the outputs of the four or more respective color signals which are converted from the input video signal includes at least a modulation signal for modulating the two-dimensional modulation elements and a modulation signal for modulating the laser light emission time.

16. A laser picture formation device as defined in claim 1, wherein the color display range in the chromaticity coordinate is controlled according to the environment.

17. A laser picture formation device as defined in claim 16, wherein the color display range is broader than the input image signal reference chromaticity range and a range which is pursuant to the input video signal reference chromaticity or a range which is pursuant to the color reproducible range.

18. A laser picture formation device comprising laser light sources and a two-dimensional modulation element which carries out modulation of video images, wherein
there are provided BGYR four color laser light sources where the center wavelength of B is 430 to 475 nm, the center wavelengths of G and Y are 480 to 560 nm, and the center wavelength of R is 610 to 680 nm;
when the pixels in the color reproducible range that can be displayed by using both of the G and Y colors are displayed, the laser light outputs from both the G and Y laser light sources are displayed.

19. A laser picture formation device as defined in claim 18, wherein
when the pixel within the color reproducible range that can be displayed by using both of G and Y colors are displayed, the luminances of G and Y colors displayed in the pixel comprise one being $2/3$ to $3/2$ of the other.

20. A laser picture formation device comprising a laser light source and one two-dimensional modulation element for carrying out modulation of video images, wherein
there are four or more laser light sources each having a different center wavelength;
the four or more laser light sources being operable at times when the plural color laser light sources are caused to emit laser lights to the two-dimensional modulation element by the one two-dimensional modulation element operating time-divisionally.

21. A laser picture formation device as defined in claim 20, wherein the respective plural color laser light sources control the output power modulation in the time during when the self laser light source and the other laser light source emit simultaneously the laser outputs to the two-dimensional modulation element and the output power modulation in the time during when the self laser light source emits only one color to the two-dimensional modulation element independently from each other.

22. A laser picture formation device as defined in claim 21, wherein
the laser cooling temperature is controlled accompanying with the emission power modulation of the laser light source.

23. A laser picture formation method which employs four or more laser light sources and one or more two-dimensional modulation elements carrying out modulation of video images to produce video images, which comprises:
carrying out video image formation with performing modulations of video images using one or plural two-dimensional video image modulation elements and modulations of laser light outputs from the four or more laser light sources with synchronizing those with each other, wherein
when pixels in the color reproducible range that can be displayed by using both G and Y colors are displayed, the laser light outputs from both the G and Y laser light sources are displayed.

* * * * *